United States Patent [19]
Young

[11] Patent Number: 5,997,424
[45] Date of Patent: Dec. 7, 1999

[54] RANDOM ENGAGEMENT ROLLER CHAIN SPROCKET WITH STAGED MESHING AND ROOT RELIEF TO PROVIDE IMPROVED NOISE CHARACTERISTICS

[75] Inventor: James D. Young, Chesaning, Mich.

[73] Assignee: Cloyes Gear and Products, Inc., Mentor, Ohio

[21] Appl. No.: 09/277,058

[22] Filed: Mar. 26, 1999

Related U.S. Application Data

[60] Provisional application No. 60/079,414, Mar. 26, 1998.

[51] Int. Cl.$^6$ .............................. F16H 7/06; F16G 13/04; F16G 13/02
[52] U.S. Cl. .......................... 474/156; 474/212; 474/231
[58] Field of Search .................................. 474/148, 152, 474/155–157, 158–160, 900, 212, 231

[56] References Cited

U.S. PATENT DOCUMENTS

| | | | |
|---|---|---|---|
| 2,667,792 | 2/1954 | Bendall | 474/157 |
| 5,397,278 | 3/1995 | Suzuki et al. | 474/156 |
| 5,419,743 | 5/1995 | Takeda et al. | 474/157 |
| 5,830,096 | 11/1998 | Schmidt et al. | 474/160 |
| 5,848,948 | 12/1998 | Allen | 474/156 |
| 5,876,159 | 3/1999 | Tseng et al. | 474/152 |
| 5,876,295 | 3/1999 | Young | 474/156 |
| 5,921,878 | 7/1999 | Young | 474/160 |
| 5,921,879 | 7/1999 | Young | 474/202 |

FOREIGN PATENT DOCUMENTS 0 818 644 A2  6/1997  European Pat. Off. .

*Primary Examiner*—Tamara L. Graysay
*Assistant Examiner*—Matthew A. Kaness
*Attorney, Agent, or Firm*—Fay, Sharpe, Fagan Minnich & McKee, LLP

[57] ABSTRACT

A random engagement roller chain sprocket for use primarily in automotive engine chain drive applications which incorporates different asymmetrical tooth profiles for improved noise reduction. In particular, the sprocket includes a number of first teeth each having a first engaging flank and a first disengaging flank, and a number of second teeth each having a second engaging flank and a second disengaging flank. One of the first engaging flanks cooperating with one of the first disengaging flanks or the second disengaging flanks of a first adjacent tooth to define a first asymmetrical tooth space for receiving a roller of an associated roller chain. The first asymmetrical tooth space including a first root surface between the one of the first engaging flanks and the first disengaging flanks or the second disengaging flanks. The first root surface being adapted for contacting a roller of an associated roller chain during rotation of the sprocket. One of the second engaging flanks cooperating with one of the first disengaging flanks or the second disengaging flanks of a second adjacent tooth to define a second asymmetrical tooth space for receiving a roller of an associated roller chain. The second asymmetrical tooth space including a second root surface between the one of the second engaging flanks and the first disengaging flanks or the second disengaging flanks. The second root surface being spaced from a roller of an associated roller chain so as to define a clearance therebetween during rotation of the sprocket.

24 Claims, 35 Drawing Sheets

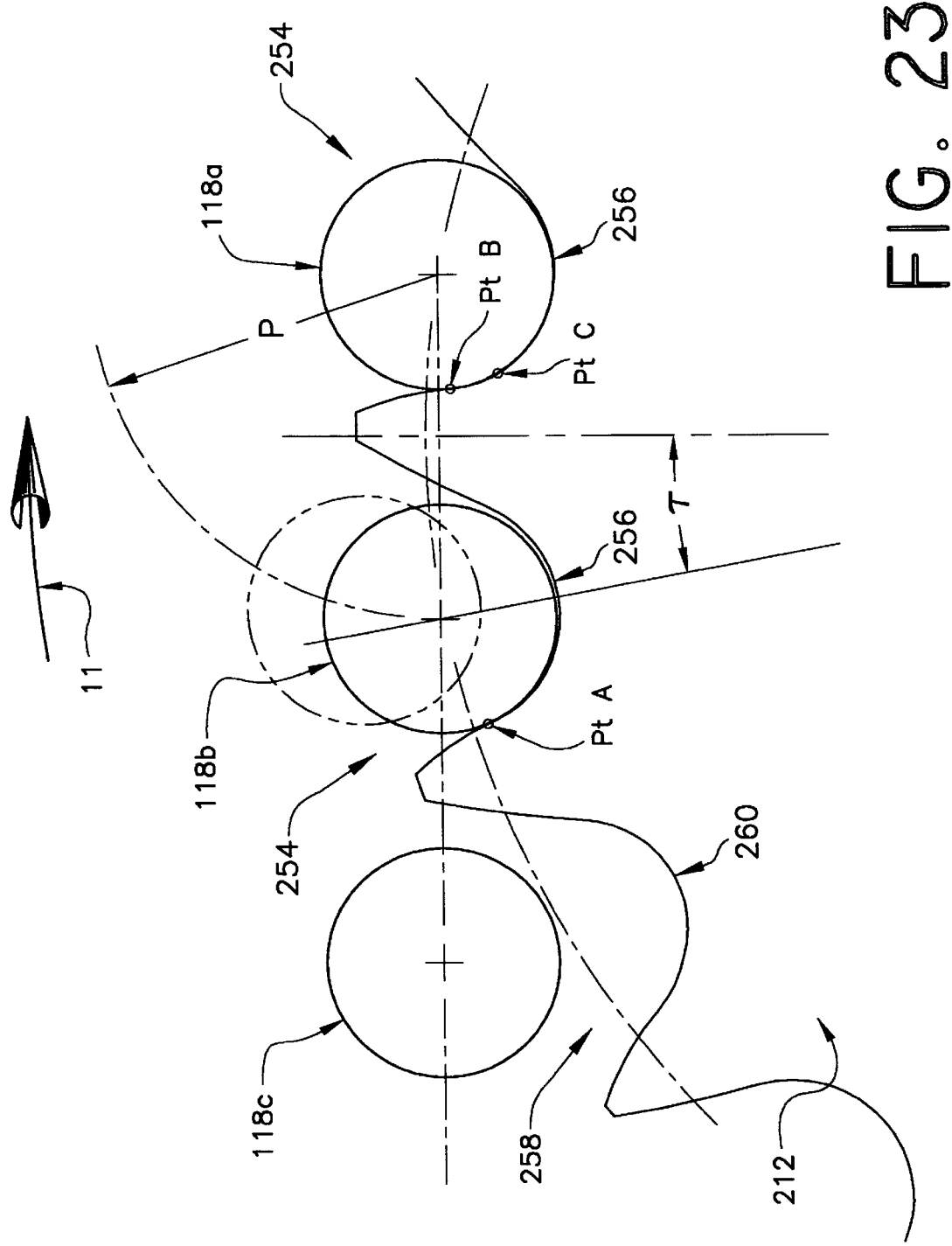

ISO

| Z | A | α (MIN) | (MAX) | γ (MAX) | (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 25
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 6.25 | 80.00 | 0 | 82.00 | -2 |
| 19 | 18.947 | 74.08 | 6.45 | 80.53 | 0 | 82.53 | -2 |
| 20 | 18.000 | 74.38 | 6.63 | 81.00 | 0 | 83.00 | -2 |
| 21 | 17.143 | 74.64 | 6.79 | 81.43 | 0 | 83.43 | -2 |
| 22 | 16.364 | 74.89 | 6.93 | 81.82 | 0 | 83.82 | -2 |
| 23 | 15.652 | 75.11 | 7.07 | 82.17 | 0 | 84.17 | -2 |
| 24 | 15.000 | 75.31 | 7.19 | 82.50 | 0 | 84.50 | -2 |
| 25 | 14.400 | 75.50 | 7.30 | 82.80 | 0 | 84.80 | -2 |
| 26 | 13.846 | 75.67 | 7.40 | 83.08 | 0 | 85.08 | -2 |
| 27 | 13.333 | 75.83 | 7.50 | 83.33 | 0 | 85.33 | -2 |
| 28 | 12.857 | 75.98 | 7.59 | 83.57 | 0 | 85.57 | -2 |
| 29 | 12.414 | 76.12 | 7.67 | 83.79 | 0 | 85.79 | -2 |
| 30 | 12.000 | 76.25 | 7.75 | 84.00 | 0 | 86.00 | -2 |

Fig. 26

RANDOM ENGAGEMENT ROLLER CHAIN SPROCKET WITH STAGED MESHING AND ROOT RELIEF TO PROVIDE IMPROVED NOISE CHARACTERISTICS

CROSS REFERENCE TO RELATED APPLICATIONS

This application claims the benefit of U.S. Provisional Patent Application Ser. No. 60/079,414, filed Mar. 26, 1998.

BACKGROUND OF THE INVENTION

The present invention relates to the automotive timing chain art. It finds particular application in conjunction with a unidirectional roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to ISO (International Organization for Standardization) standard 606:1994(E). The ISO-606 standard specifies requirements for short-pitch precision roller chains and associated chain wheels or sprockets.

FIG. 1 illustrates a symmetrical tooth space form or an ISO-606 compliant sprocket. The tooth space has a continuous fillet or root radius $R_i$ extending from one tooth flank (i.e., side) to the adjacent tooth flank as defined by the roller seating angle $\alpha$. The flank radius $R_f$ is tangent to the roller seating radius $R_1$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle $\alpha$ is defined as:

$$\alpha_{max}=(140°-90°)/Z \text{ and } \alpha_{min}=(120°-90°)/Z$$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. A central portion of the taut strand 22 may be guided between the driven sprocket 14 and the drive sprocket 12 with a chain guide 26. A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) occurring during the meshing process. The impact energy ($E_A$) is related to engine speed, chain mass, and the impact velocity between the chain and the sprocket at the onset of meshing. The impact velocity is affected by the chain-sprocket engagement geometry, of which an engaging flank pressure angle $\gamma$ (FIG. 3) is a factor, where:

$$E_A = \frac{wP}{2000} V_A^2;$$

$$V_A = \frac{\pi n P}{30000} \sin\left(\frac{360}{Z} + \gamma\right);$$

$$\gamma = \frac{180 - A - \alpha}{2}; \text{ and}$$

$E_A$=Impact Energy [N·m]
$V_A$=Roller Impact Velocity [m/s]
$\gamma$=Engaging Flank Pressure Angle
n=Engine Speed [RPM]
w=Chain Mass [Kg/m]
Z=Number of Sprocket Teeth
A=Tooth Angle (360°/Z)
$\alpha$=Roller Seating Angle
P=Chain Pitch (Chordal Pitch)

The impact energy ($E_A$) equation presumes the chain drive kinematics will conform generally to a quasi-static analytical model and that the roller-sprocket driving contact will occur at a tangent point TP (FIG. 3) of the flank and root radii as the sprocket collects a roller from the span.

As shown in FIG. 3, the pressure angle $\gamma$ is defined as the angle between a line A extending from the center of the engaging roller 28, when it is contacting the engaging tooth flank at the tangency point TP, through the center of the flank radius $R_f$, and a line B connecting the centers of the fully seated roller 28, when it is seated on root diameter $D_2$ (Point A), and the center of the next meshing roller 30, as if it were also seated on root diameter $D_2$ in its engaging tooth space. The roller seating angles $\alpha$ and pressure angles $\gamma$ listed in FIG. 25 are calculated from the equations defined above. It should be appreciated that $\gamma$ is a minimum when $\alpha$ is a maximum. The exemplary 18-tooth, ISO-606 compliant, sprocket 12 of FIG. 3 will have a pressure angle $\gamma$ in the range of 12.5° to 22.5° as listed in the table of FIG. 25.

FIG. 3 also shows the engagement path (phantom rollers) and the driving contact position of roller 28 (solid) as the drive sprocket 12 rotates in the direction of arrow 11. FIG. 3 depicts the theoretical case with chain roller 27 seated on root diameter $D_2$ of a maximum material sprocket with both chain pitch and sprocket chordal pitch equal to theoretical pitch P. For this theoretical case, the noise occurring at the onset of roller engagement has a radial component $F_R$ as a result of roller 28 colliding with the root surface $R_i$ and a tangential component $F_T$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have a tangential and radial impact (occurring in any order), would therefore seem to be at variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial collision during meshing, and its effect on noise levels, can be evaluated apart from the impact energy ($E_A$) equation.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between the unloaded rollers and the sprocket teeth as the rollers travel around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap, even as the roller chain wears. The amount of pitch line clearance added to the tooth space defines a length of a short arc that is centered in the tooth space and forms a segment of the root diameter $D_2$. The root fillet radius $R_i$ is tangent to the flank radius $R_F$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at impact.

Chordal action, or chordal rise and fall, is another important factor affecting the operating smoothness and noise levels of a chain drive, particularly at high speeds. Chordal action occurs as the chain enters the sprocket from the free span during meshing and it can cause a movement of the free chain in a direction perpendicular to the chain travel but in the same plane as the chain and sprockets. This chain motion resulting from chordal action will contribute an objectionable noise level component to the meshing noise levels, so it is therefore beneficial to reduce chordal action inherent in a roller chain drive.

FIGS. 4a and 4b illustrate the chordal action for an 18-tooth, ISO-606 compliant, sprocket having a chordal pitch of 9.525 mm. Chordal rise 45 may conventionally be defined as the displacement of the chain centerline as the sprocket rotates through an angle A/2, where:

$$\text{Chordal rise} = r_p - r_c = r_p[1 - \cos(180°/Z)]$$

where $r_c$ is the chordal radius, or the distance from the sprocket center to a pitch chord of length P; $r_p$ is the actual theoretical pitch radius; and Z is the number of sprocket teeth.

It is known that a short pitch chain provides reduced chordal action compared to a longer pitch chain having a similar pitch radius. FIGS. 4a and 4b show only the drive sprocket and assume a driven sprocket (not shown) also having 18-teeth and in phase with the drive sprocket shown. In other words, at T=0 (FIG. 4a), both sprockets will have a tooth center at the 12 o'clock position. Accordingly, this chain drive arrangement under quasi-static conditions will have a top or taut strand that will move up and down in a uniform manner a distance equal to that of the chordal rise. At T=0, a roller 46 is at the onset of meshing, with chordal pitch P horizontal and in line with taut strand 22. At T=0+(A/2), (FIG. 4b), roller 46 has moved to the 12 o'clock position.

For many chain drives, the drive and driven sprockets will be of different sizes and will not necessarily be in phase. The chain guide 26 (FIG. 2) has the primary purpose to control chain strand vibration in the taut span. The geometry of the guide-chain interface also defines the length of free span chain over which chordal rise and fall is allowed to operate. FIG. 5 is an enlarged view of FIG. 2 showing the first roller 28 at the onset of engagement and the second roller 30 as the next roller about to mesh with sprocket 12. In this example, the chain guide 26 controls and guides the engaging portion of the taut strand 22 except for five (5) unsupported or "free" link pitches extending between the chain guide 26 and the engaging roller 28. This length of unsupported link pitches for the engaging portion of taut strand 22 in this example is horizontal when roller 28 is at the 12 o'clock position.

With reference to FIG. 6, the drive sprocket 12 is rotated in a clockwise direction to advance roller 28 to a new angular position (A/2)+ω, where ω is the added rotation angle as determined by a quasi-static engagement geometry with roller 28 being fully seated and roller 30 is at the instant of sprocket engagement. The roller 28 is considered to be seated and in hard contact with the root surface at $D_2$ at the onset of meshing of roller 30, and a straight line is assumed for the chain span from roller 28 to a chain pin center 48, about which the unsupported or "free" span from pin 48 to engaging roller 30 is considered to rotate.

As a result of the chordal action, the engaging free span is no longer horizontal to satisfy the roller engaging geometry. This is in contrast to the chain drive as described in FIG. 4a in which chordal action causes the taut strand to move uniformly, but in a horizontal path because the drive and driven sprockets have the same number of teeth and the sprocket teeth are in phase. It should be appreciated that the straight line assumption is valid only in a quasi-static model. The amount of movement or deviation from the straight line assumption will be a function of the drive dynamics, the chain control devices, and the chain drive and sprocket geometry. The location and chain-interfacing contour of the chain guide 26 will determine the number of free span pitches for which chain motion will take place as a result of the chordal rise and fall during the roller meshing process.

Assuming that rollers 28 and 30 are in hard contact with the sprocket root surfaces at 50 and 52, respectively, the chordal rise is the perpendicular displacement of the center of roller 30 (located on the pitch diameter PD) from the taut span 22 path as it moves from its initial meshing position shown to the 12 o'clock position. For the chain drive arrangement as described, there is no modulation to the roller meshing frequency. In other words, roller meshing for all sprocket teeth will occur at substantial y the same frequency for a constant engine speed.

Accordingly, it is desirable to develop a new and improved roller chain drive system which meets the above-stated needs and overcomes the foregoing disadvantages and others while providing better and more advantageous results.

SUMMARY OF THE INVENTION

In accordance with one aspect of the present invention, a sprocket is disclosed. The sprocket includes a number of first teeth each having a first engaging flank and a first disengaging flank, and a number of second teeth each having a second engaging flank and a second disengaging flank. One of the first engaging flanks cooperating with one of the first disengaging flanks or the second disengaging flanks of a first adjacent tooth to define a first asymmetrical tooth space for receiving a roller of an associated roller chain. The first asymmetrical tooth space including a first root surface between the one of the first engaging flanks and the first disengaging flanks or the second disengaging flanks. The first root surface being adapted for contacting a roller of an associated roller chain during rotation of the sprocket. One of the second engaging flanks cooperating with one of the first disengaging flanks or the second disengaging flanks of a second adjacent tooth to define a second asymmetrical tooth space for receiving a roller of an associated roller chain. The second asymmetrical tooth space including a second root surface between the one of the second engaging flanks and the first disengaging flanks or the second disengaging flanks. The second root surface being spaced from a roller of an associated roller chain so as to define a clearance therebetween during rotation of the sprocket.

In accordance with a further aspect of the present invention, a unidirectional roller chain drive system is disclosed. The unidirectional roller chain drive system includes a first sprocket, a second sprocket, and a roller chain having rollers in engaging contact with the first and second sprockets. At least one of the first and second sprockets including a first plurality of teeth each having a first engaging flank and a first disengaging flank and a second plurality of teeth each having a second engaging flank and a second disengaging flank. One of the first engaging flanks cooperates with one of said first disengaging flanks or said second disengaging flanks of a first adjacent tooth to define a first asymmetrical tooth space for receiving a roller associated with the roller chain. The first asymmetrical tooth space includes a first root surface between the one of the first engaging flanks and the first disengaging flanks or the second disengaging flanks. The first root surface is adapted for contacting a roller associated with roller chain during rotation of the sprocket. One of the second engaging flanks cooperates with one of said first disengaging flanks or said second disengaging flanks of a second adjacent tooth to define a second asymmetrical tooth space for receiving a roller associated with the roller chain. The second asymmetrical tooth space includes a second root surface between the one of the second engaging flanks and the first disengaging flanks or the second disengaging flanks. The second root surface is spaced from a roller of the associated roller chain so as to define a clearance therebetween during rotation of the sprocket.

In accordance with yet another aspect of the present invention, a method of modifying a meshing impact frequency of a roller chain meshing with a sprocket is disclosed. The sprocket includes a first plurality of teeth each having a first engaging flank and a first disengaging flank, and a second plurality of teeth each having a second engaging flank and a second disengaging flank. One of the first engaging flanks cooperates with one of the first disengaging flanks or the second disengaging flanks of a first adjacent tooth to define a first asymmetrical tooth space adapted for receiving a first roller of the roller chain. The first asymmetrical tooth space includes a first root surface between the one of the first engaging flanks and the first disengaging flanks or the second disengaging flanks. One of the second engaging flanks cooperates with one of the first disengaging flanks or the second disengaging flanks of a second adjacent tooth to define a second asymmetrical tooth space adapted for receiving a second roller of the roller chain. The second asymmetrical tooth space includes a second root surface between the one of the second engaging flanks and the first disengaging flanks or the second disengaging flanks. The method includes (a) during rotation of the sprocket, the first roller meshing with the first asymmetrical tooth space whereby the first roller contacts the first root surface; and (b) during rotation of the sprocket, the second roller meshing with the second aysmmetrical tooth space whereby a clearance is maintained between the second roller and the second root surface such that the second roller does not contact at least a portion of the second root surface.

One advantage of the present invention is the provision of a roller chain sprocket which incorporates a flank flat on an engaging tooth surface which facilitates altering a meshing contact from a first tooth profile to a second tooth profile.

Another advantage of the present invention is the provision of a roller chain sprocket which incorporates a flank flat on an engaging tooth surface which effects a time delay between an initial roller-to first sprocket tooth profile contact and an initial roller-to-second sprocket tooth profile contact.

Another advantage of the present invention is the provision of a roller chain sprocket which incorporates a flank flat on an engaging tooth surface of a first tooth profile which facilitates phasing a frequency of initial roller-to-engaging flank contacts of the first tooth profile relative to initial roller-to-engaging flank contacts of a second tooth profile to alter the rhythm of the initial roller-to-first engaging flank and the roller-to-second engaging flank contacts.

Another advantage of the present invention is the provision of a roller chain sprocket which incorporates added pitch mismatch between the sprocket and roller chain to facilitate a "staged" roller-to-sprocket impact.

Still another advantage of the present invention is the provision of a roller chain sprocket which incorporates an inclined root surface on an engaging flank, a coast flank, or both an engaging flank and a coast flank to provide tooth space clearance.

Yet another advantage of the present invention is the provision of a roller chain sprocket which minimizes impact noise generated by a roller-sprocket collision during meshing.

A further advantage of the present invention is the provision of a roller chain sprocket which minimizes broadband mechanical noise generated by unloaded rollers in a sprocket wrap.

A still further advantage of the present invention is the provision of a roller chain sprocket which provides a "staged" roller impact wherein a tangential impact occurs first followed by a radial impact at full mesh.

Yet a further advantage of the present invention is the provision of a roller chain sprocket which spreads roller engagement over a significant time interval to provide for a more gradual load transfer, thereby minimizing roller-sprocket impact and the inherent noise generated therefrom.

Yet a further advantage of the present invention is the provision of a roller chain sprocket having two sets of sprocket teeth incorporating different tooth profiles which cooperate to reduce chain drive system noise levels below a noise level which either tooth profile used alone would produce.

Further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 23 illustrates the sprocket of FIG. 22 with a first roller fully seated in two-point contact with the sprocket, a second roller at the onset of initial contact with the sprocket, and a third roller about to mesh with the drive sprocket;

FIG. 25 is a table listing roller seating angles α and pressure angles γ for a number of different ISO-606 complaint sprocket sizes; and FIG. 26 is a table listing the maximum Beta (β) angles and the corresponding pressure angles (γ) for three different asymmetrical tooth space profiles (1–3, of varying sprocket sizes.

DETAILED DESCRIPTION OF THE PREFERRED EMBODIMENTS

Figure 1:
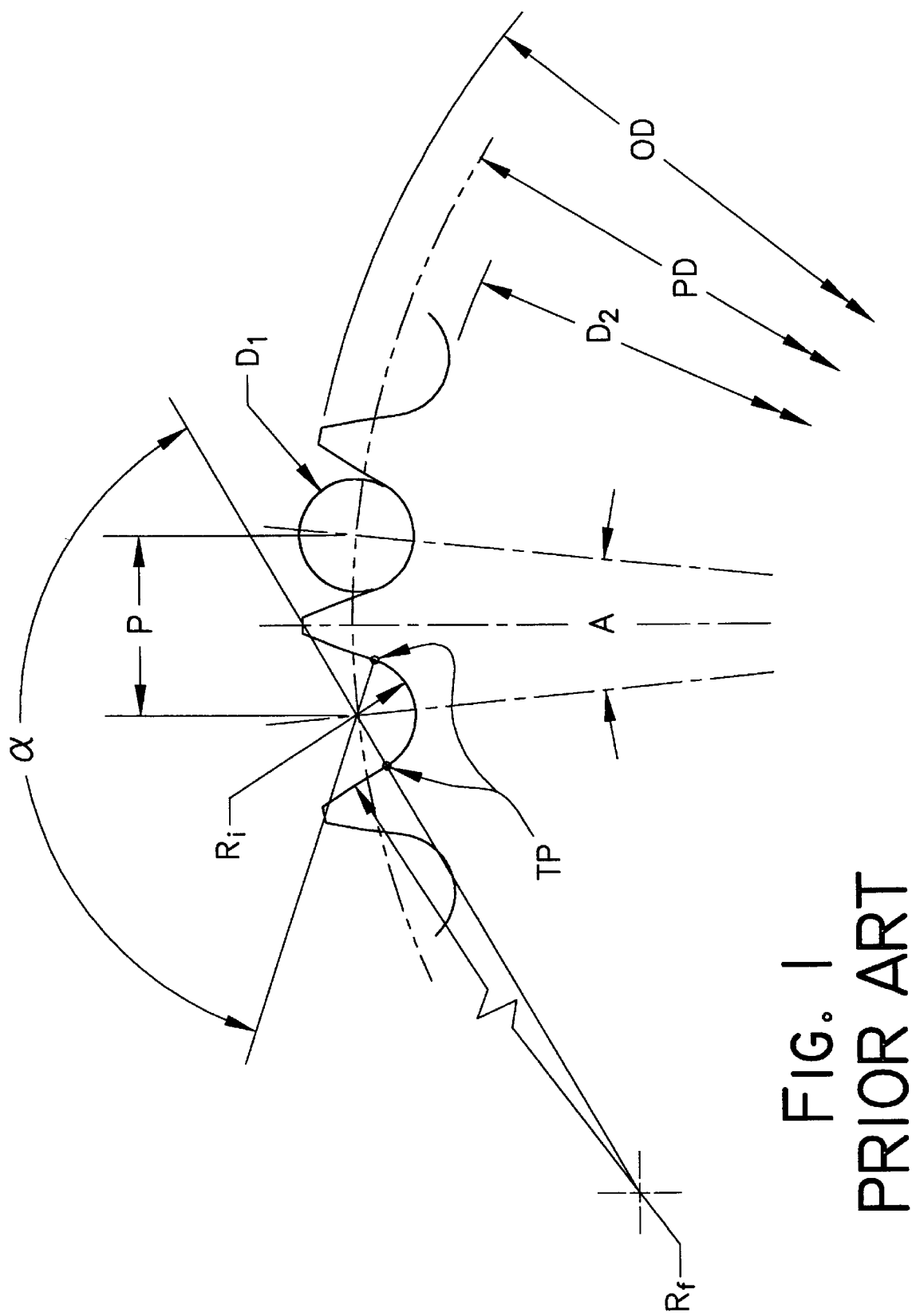
FIG. 1 illustrates a symmetrical tooth space form for an ISO-606 compliant roller chain sprocket.
Figure 2:
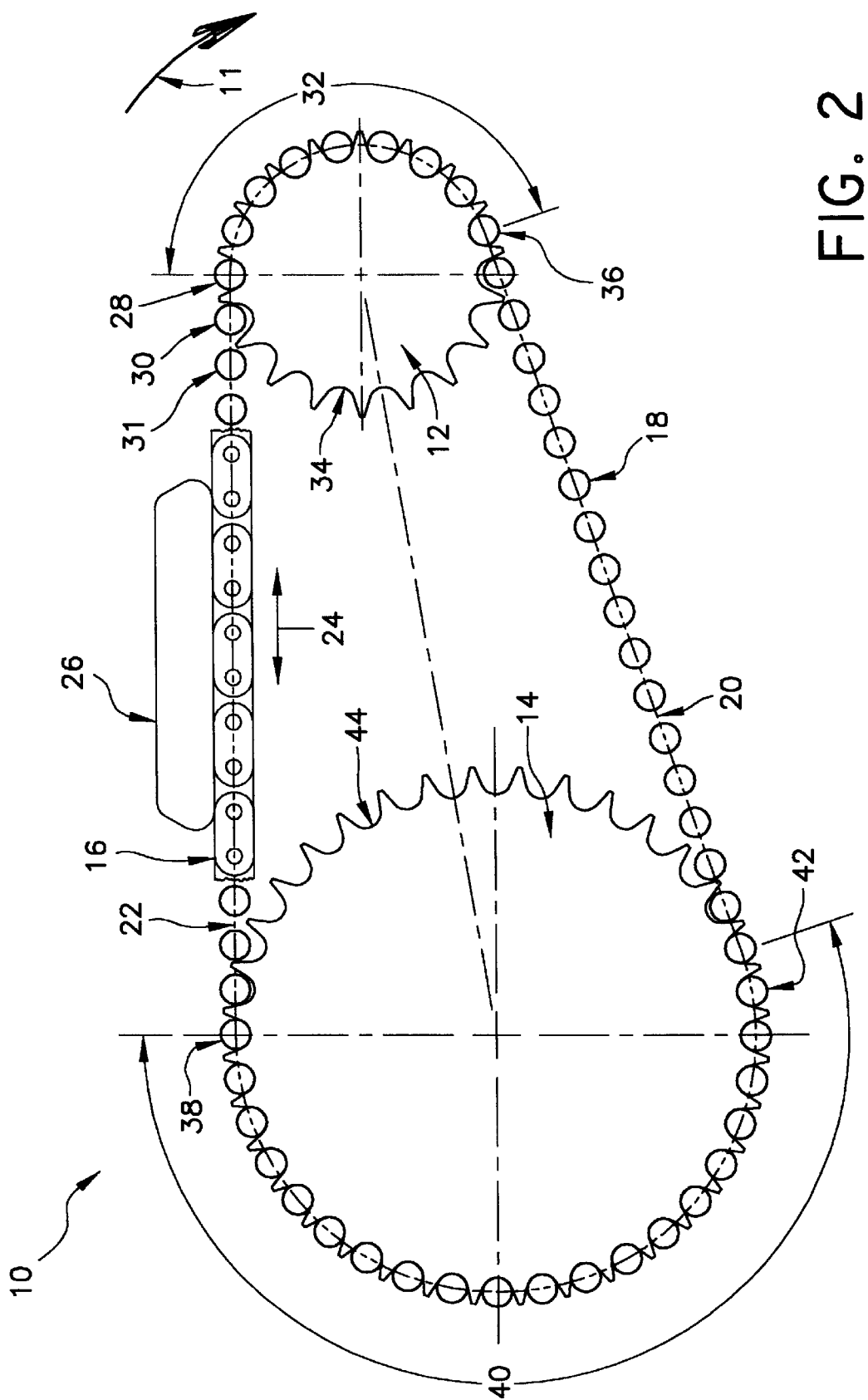
FIG. 2 is an exemplary roller chain drive system having an ISO-606 compliant drive sprocket, driven sprocket, and roller chain.
Figure 3:
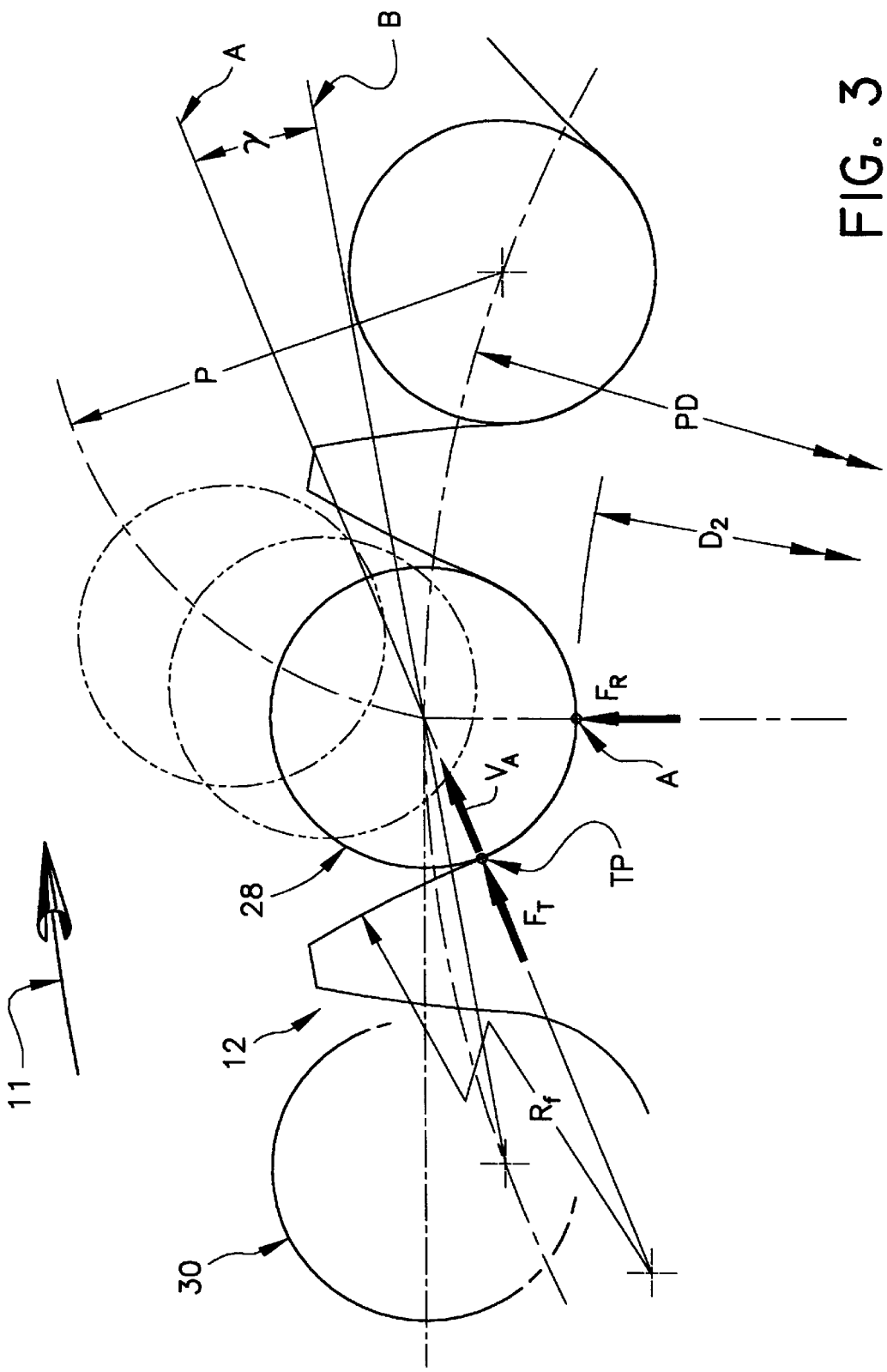
FIG. 3 shows an engagement path (phantom) and a roller (solid) in a driving position as an exemplary ISO-606 compliant drive sprocket rotates in a clockwise direction.
Figures 4A, 4B:
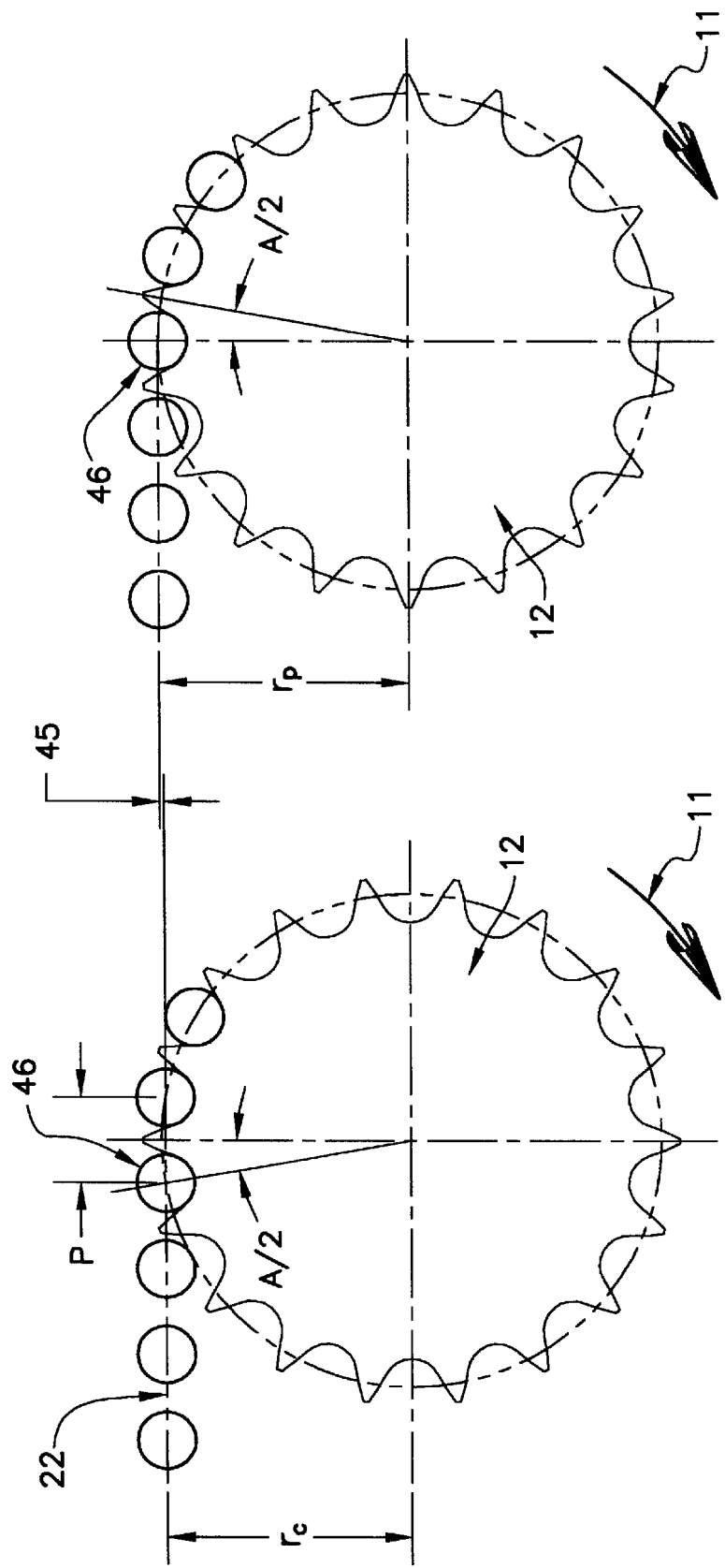
FIG. 4a shows a roller at the onset of meshing with an exemplary ISO-606 compliant drive sprocket.
FIG. 4b shows the drive sprocket of FIG. 4a rotated in a clockwise direction until the roller is at a 12 o'clock position.
Figure 5:
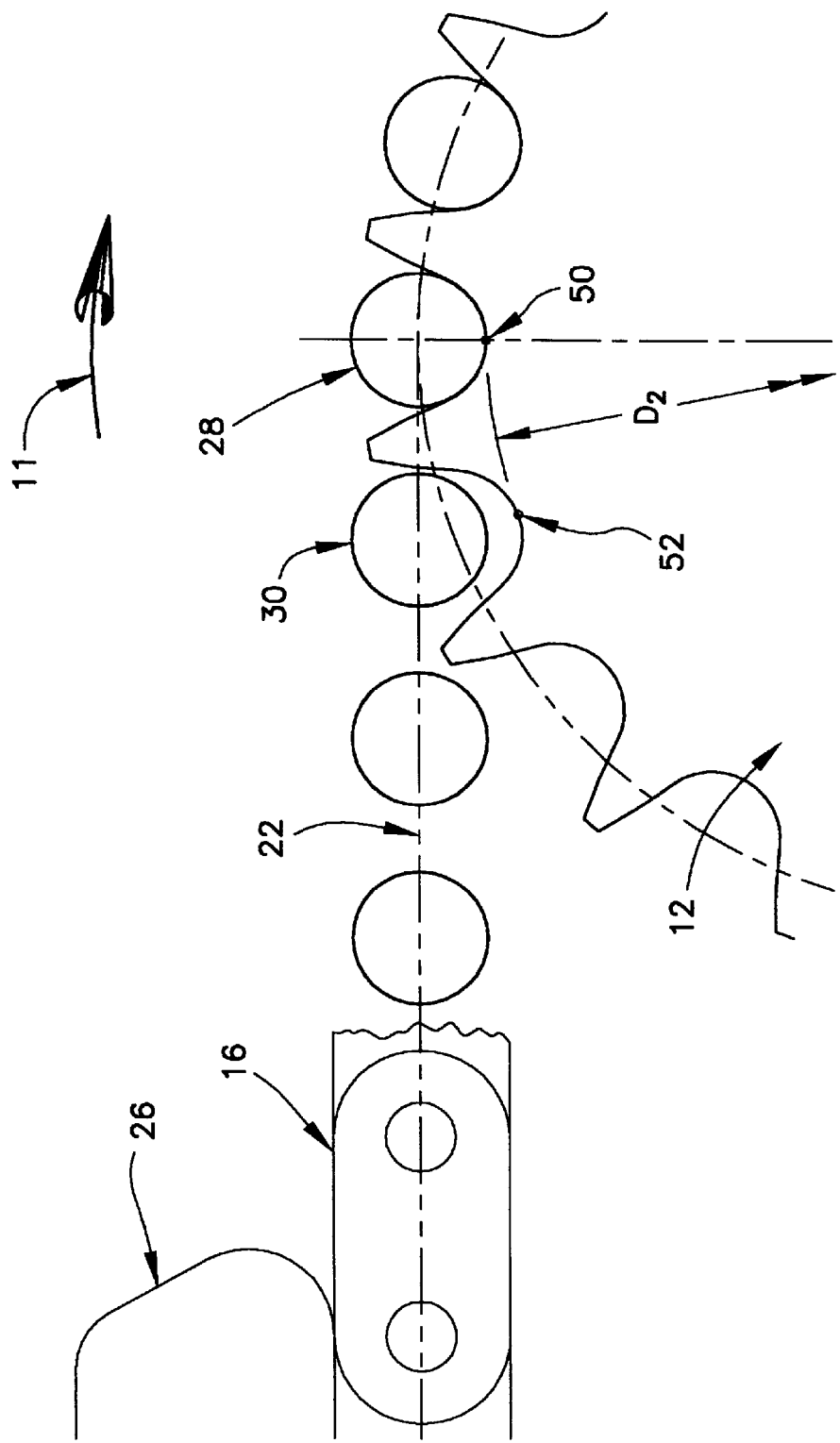
FIG. 5 is an enlarged view of the ISO-606 compliant drive sprocket of FIG. 2 with a roller fully seated in a tooth space and a second roller about to mesh with the drive sprocket.
Figure 6:
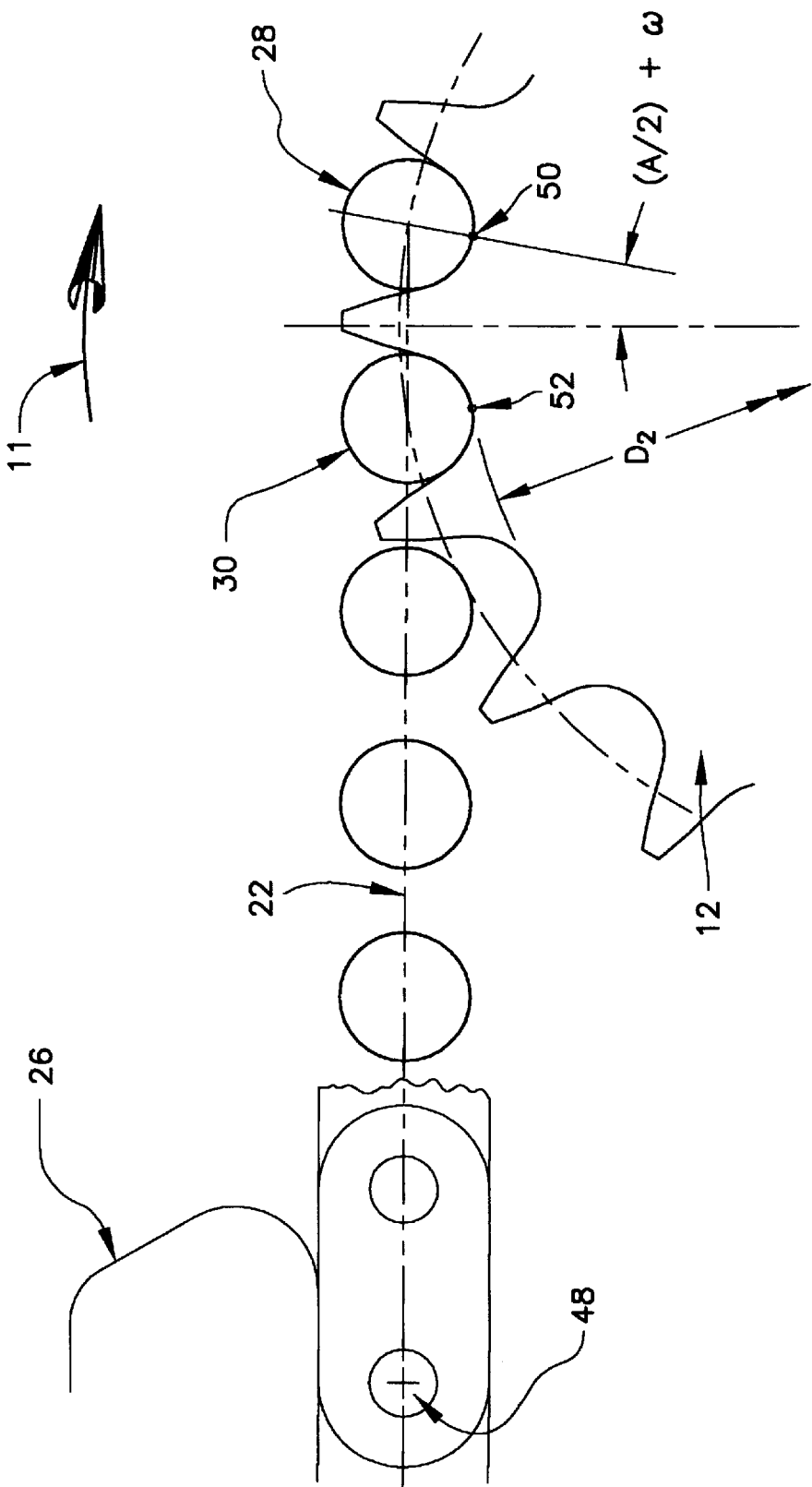
FIG. 6 shows the drive sprocket of FIG. 5 rotated in a clockwise direction until the second roller initially contacts a root surface (i.e., radial impact) of the drive sprocket, under theoretical conditions.
Figure 7:
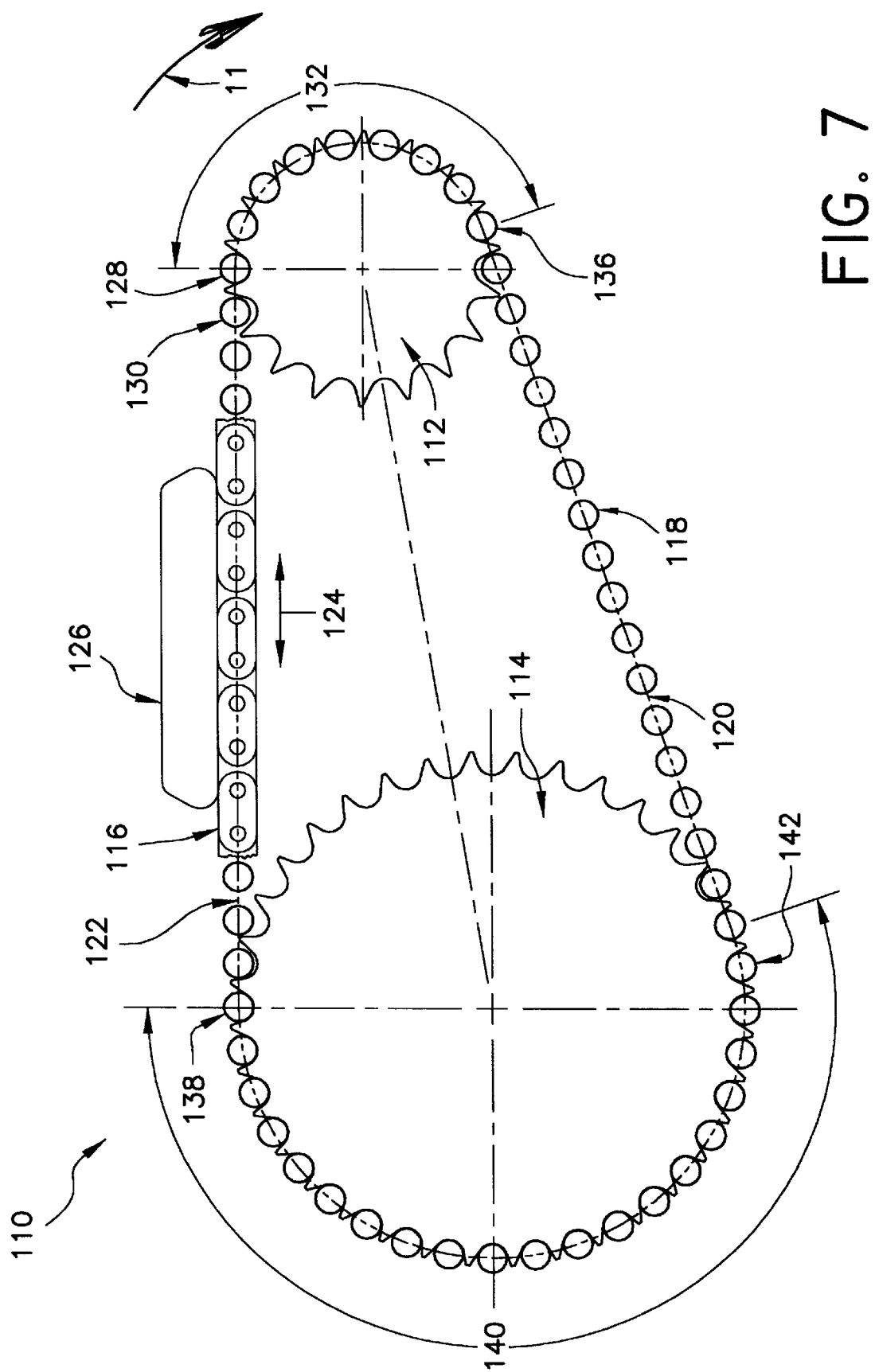
FIG. 7 illustrates an exemplary roller chain drive system that incorporates the features of the present invention.

With reference now to FIG. 7, a roller chain drive system 110 includes a drive sprocket 112 and a driven sprocket 114 which incorporate the features of the present invention therein. The roller chain drive system 110 further includes a roller chain 116 having a number of rollers 118 which engage and wrap about sprockets 112, 114. The roller chain rotates in a clockwise direction as shown by arrow 11.

The roller chain 116 has two spans extending between the sprockets, slack strand 120 and taut strand 122. The roller chain 116 is under tension as shown by arrows 124. A central portion of the taut strand 122 may be guided between the driven sprocket 114 and the drive sprocket 112 with a chain guide 126. A first roller 128 is shown fully seated at a 12 o'clock position on the drive sprocket 112. A second roller 130 is adjacent to the first roller 128 and is the next roller to mesh with the drive sprocket 112.

To facilitate the description of an asymmetrical tooth profiles of the present invention, reference will be made only to the drive sprocket 112. However, the asymmetrical tooth profiles of the present invention are equally applicable to the driven sprocket 114, as well as to other types of sprockets such as idler sprockets and sprockets associated with counter rotating balance shafts, etc.

Figure 8:
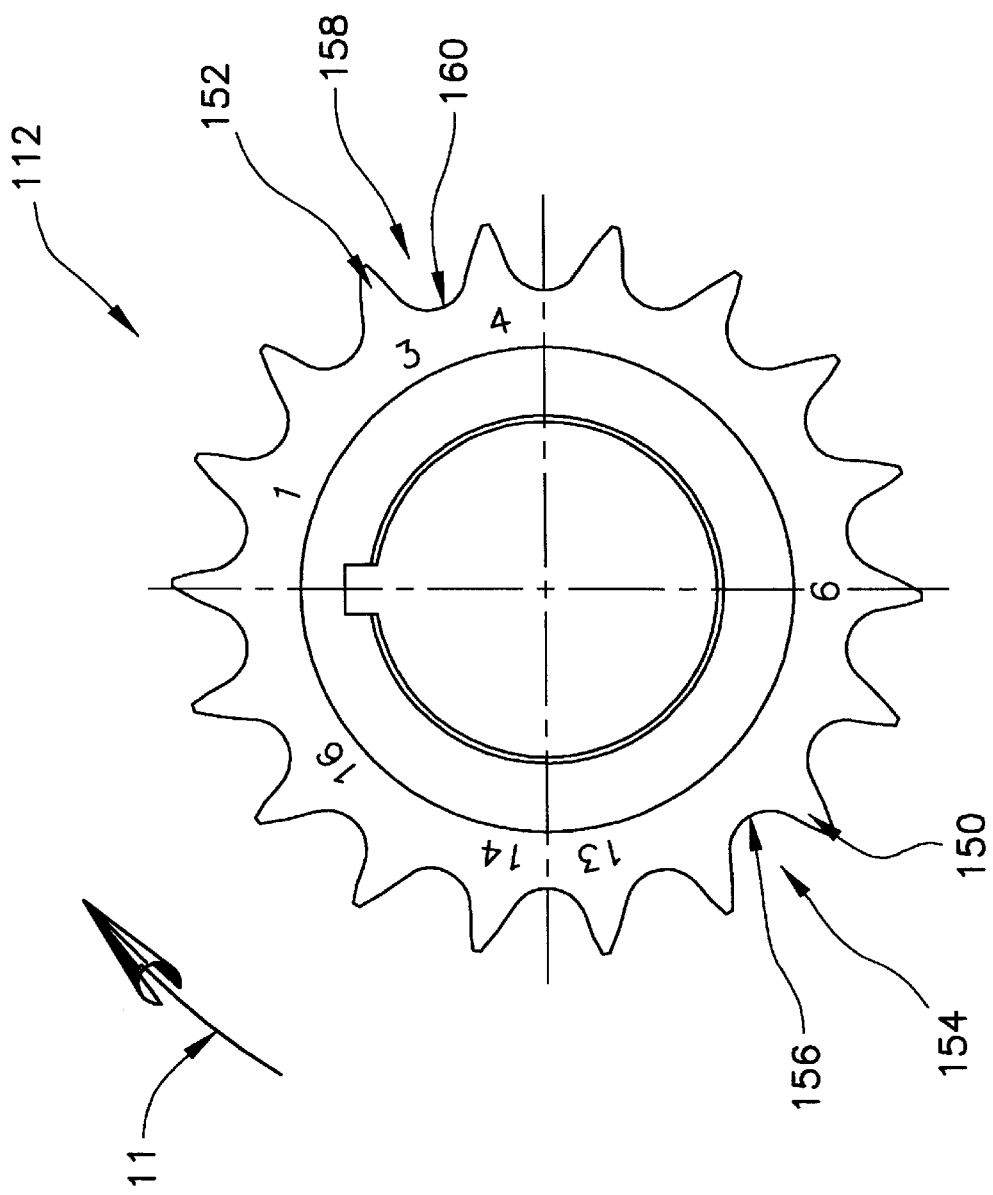
FIG. 8 illustrates a first embodiment of a random-engagement roller chain drive sprocket of the drive system of FIG. 7.

With reference to FIG. 8, a first embodiment of a random-engagement roller chain drive sprocket 112. The sprocket 112 is illustrated as an 18-tooth sprocket. However, the sprocket 112 may have more or lees teeth, as desired. The sprocket 112 includes a first number of sprocket teeth 150 and a second number of sprocket teeth 152 (numbered as sprocket teeth 1, 3, 4, 9, 13, 14, and 16). In the embodiment being described, there are eleven sprocket teeth 150 and seven sprocket teeth 152 arbitrarily positioned around the sprocket 112. However, it should be appreciated that the number and position of each type of sprocket tooth can vary without departing from the scope of the invention.

The sprocket teeth 150 each include an engaging side or flank profile that cooperates with a disengaging side or flank profile of an adjacent tooth (in a clockwise-manner) to form a first asymmetrical tooth space 154 having a root surface 156. The sprocket teeth 152 each include and engaging side or flank profile that cooperates with a disengaging side or flank profile of an adjacent tooth (in a clockwise-manner) to form a second asymmetrical tooth space 158 having a root surface 160. As described further below, the first and second groups of sprocket teeth 150, 152 cooperate to reduce chain drive system noise levels below a noise level which either tooth profile used alone would produce.

Figure 9:
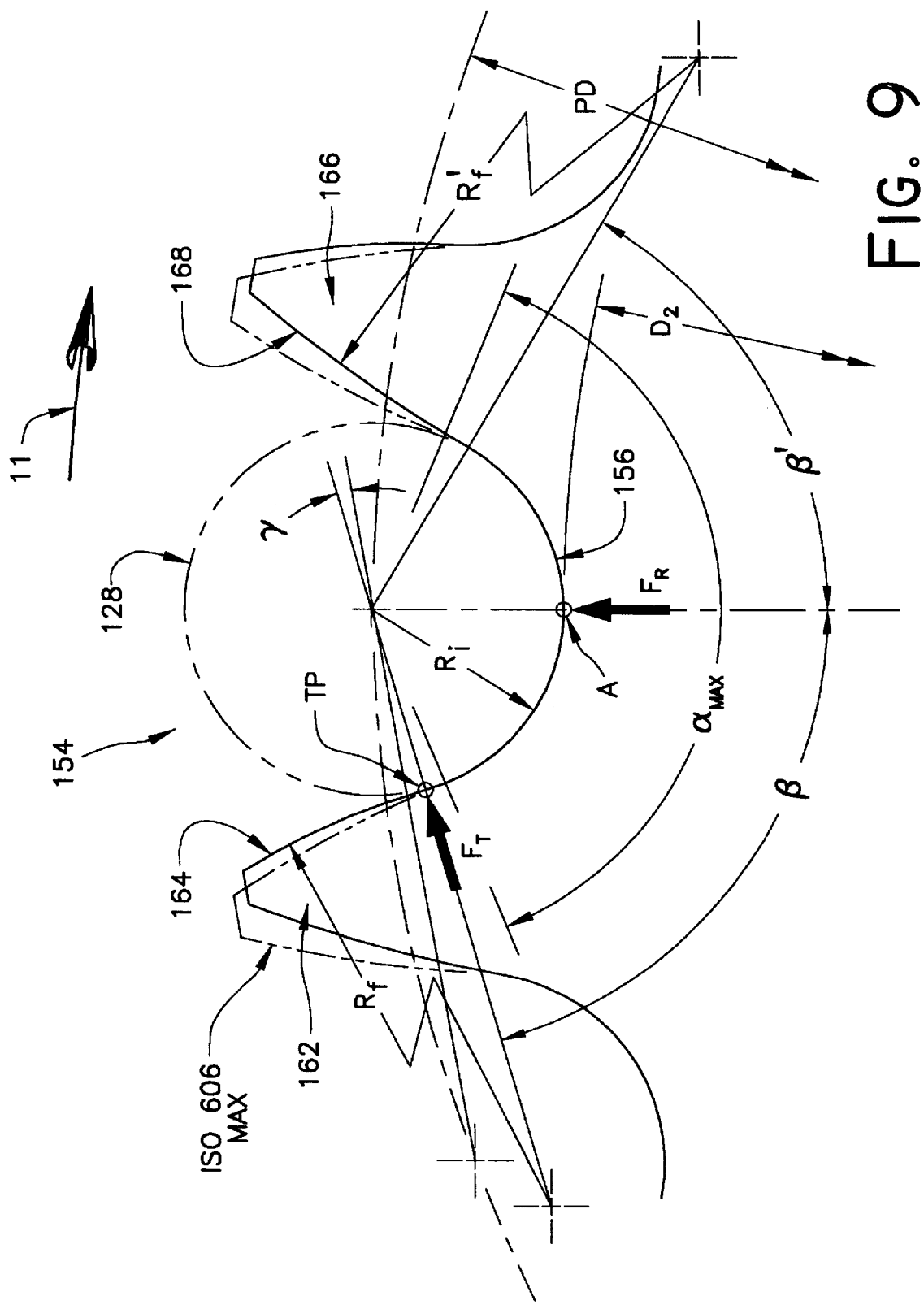
FIG. 9 illustrates a first asymmetrical tooth space profile for the random-engagement roller chain drive sprocket of FIG. 8.

Referring now to FIG. 9, the sprocket 112 includes a first tooth 162 having an engaging side or flank 164, and a second tooth 166 having a disengaging side or flank 168. The engaging flank 164 and disengaging flank 168 cooperate to define one of the tooth spaces 154 for receiving a roller associated with the chain 116, such as roller 128 (shown in phantom). Thus, the sprocket tooth 162 is necessarily classified as one of the teeth 150, and the sprocket tooth 166 can be classified as either one of the sprocket teeth 150 or 152.

The engaging flank 164 has a radius $R_f$ which is tangent to a first radially outer end of the root surface 156. The root surface has a radius $R_i$. The disengaging flank 168 has a radius $R_f'$ which is tangent to a second radially outer end of the root surface 156. The location of the tangency point TP between the engaging flank 164 and the root surface 156 is defined by an engaging flank roller seating angle β. The engaging flank roller seating angle β and a disengaging flank roller seating angle β' replace the ISO-606 roller seating angle α (ISO profile shown in phantom). The pressure angle γ is a function of the engaging flank roller seating angle β. That is, as β increases, γ decreases. A minimum asymmetrical pressure angle $\gamma_{min}$ can be determined from equation (1), where:

$$\gamma_{min}=\beta_{max}-(\alpha_{max}/2+\gamma_{ISO\ min}) \quad \text{Eq. 1}$$

Therefore, an asymmetrical pressure angle $\gamma_{min}$=0 when $\beta_{max}=(\alpha_{max}/2+\gamma_{ISO\ min})$ as illustrated in the table of FIG. 26. In particular, the table of FIG. 26 lists the maximum Beta (β) angles and the corresponding pressure angles (γ) for several sprocket sizes and several asymmetrical profiles. It should be appreciated that reducing the engaging flank pressure angle γ reduces the tangential impact force component $F_T$ and thus the tangential impact noise contribution to the overall noise level at the onset of engagement.

Impact force $F_T$ is a function of the impact velocity which in turn is related to the pressure angle γ. As pressure angle γ is reduced, it provides a corresponding reduction in the impact velocity between the chain and the sprocket at the onset of meshing resulting in improved NVH characteristics. The engaging flank pressure angles γ for the asymmetrical tooth space profiles of the present invention are in the range of about −2° to about 12°. In the embodiment of FIG. 9, the roller seating angle β is greater than ISO $\alpha_{max}/2$ at a maximum material condition. However, β can be adjusted until a desired engaging flank pressure angle γ is achieved.

Figure 10:
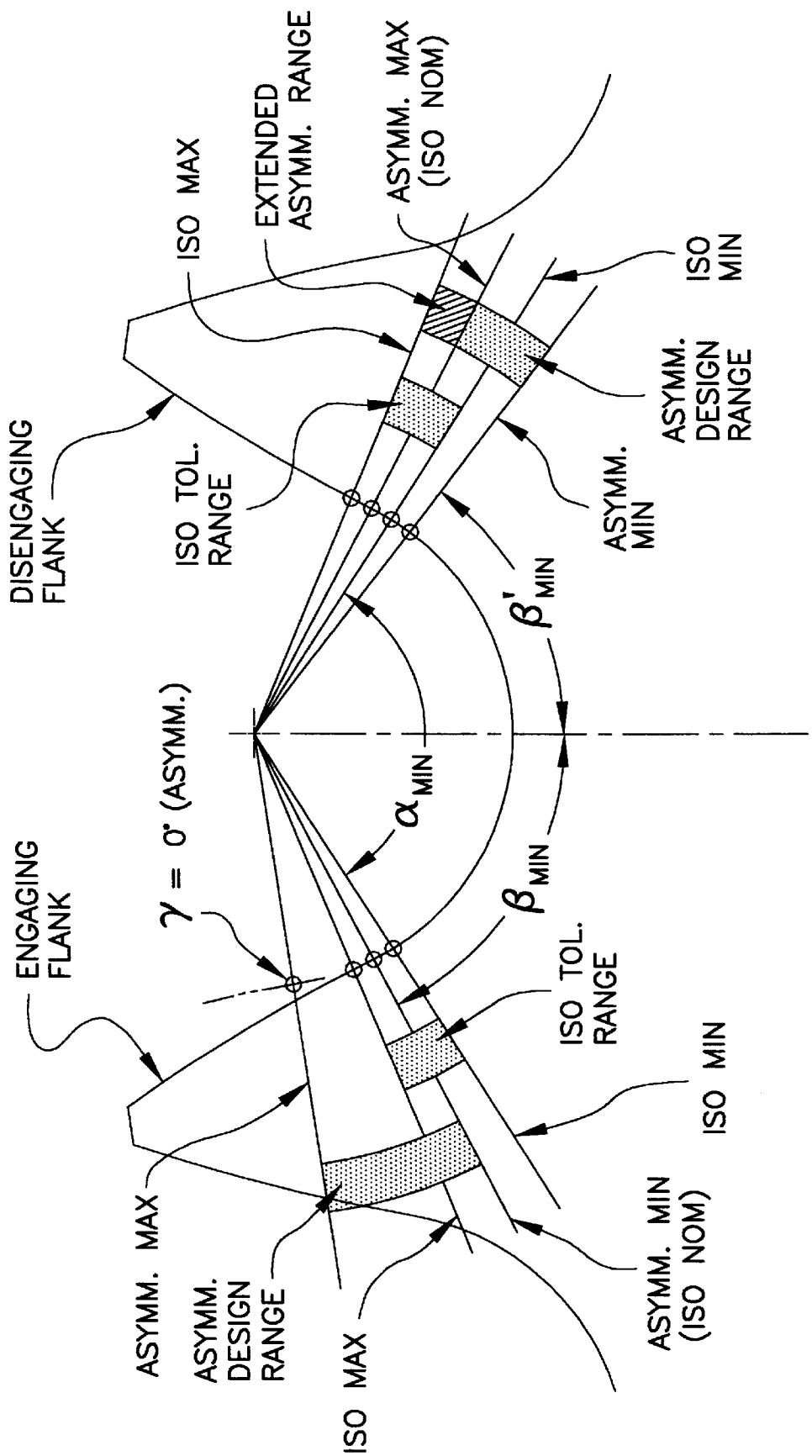
FIG. 10 is a comparison between the tolerance range for an ISO-606 roller seating angle α and the tolerance ranges for the engaging flank roller seating angle β and the disengaging flank roller seating angle β' of the present invention.

FIG. 10 illustrates the tolerance range for the ISO-606 roller seating angle α. Thus, an ISO-606 compliant sprocket has a roller seating angle α that complies with the equation:

$$\alpha_{min} \leq \alpha \leq \alpha_{max} \qquad \text{Eq. 2}$$

In one embodiment of the present invention, the tolerance ranges for the engaging flank roller seating angles β and the disengaging flank roller seating angles β' of the present invention comply with the equations:

$$\beta \geq \text{ISO } \alpha_{nom}/2 \qquad \text{Eq. 3}$$

$$\beta' \leq \text{ISO } \alpha_{nom}/2 \qquad \text{Eq. 4}$$

$$\beta \geq \beta' \qquad \text{Eq. 5}$$

The asymmetrical tooth space, the engaging flank roller seating angle β can be adjusted until the engaging flank pressure angle γ is within the range specified above. Related U.S. Pat. No. 5,876,295 is assigned to the assignee of the present invention and discloses various asymmetrical tooth space embodiments where one or both of the engaging flank roller seating angle β and the disengaging flank roller seating angle β' are within the ISO-606 roller seating angle α tolerance range, and/or outside of the ISO-606 roller seating angle α tolerance range. U.S. Pat. No. 5,876,295 is hereby incorporated by reference for all that it illustrates and discloses.

It should be appreciated that for some chain drives, the range of the disengaging flank roller seating angle β' can be extended to satisfy a specific geometry requirement or to satisfy the dynamics of a specific drive. That is, as shown in FIG. 10, the tolerance range for the engaging flank roller seating angle β and the disengaging flank roller seating angle β' of another embodiment of the present invention comply with the equations:

$$\beta \geq \text{ISO } \alpha_{nom}/2 \qquad \text{Eq. 3}$$

$$\beta' \leq \text{ISO } \alpha_{max}/2 \qquad \text{Eq. 4a}$$

$$\beta \geq \beta' \qquad \text{Eq. 5}$$

For these chain drives, it is anticipated that a preferred tooth profile could have β equal to β' within the range of ISO $\alpha_{nom}/2$ to ISO $\alpha_{max}/2$.

Figure 11:
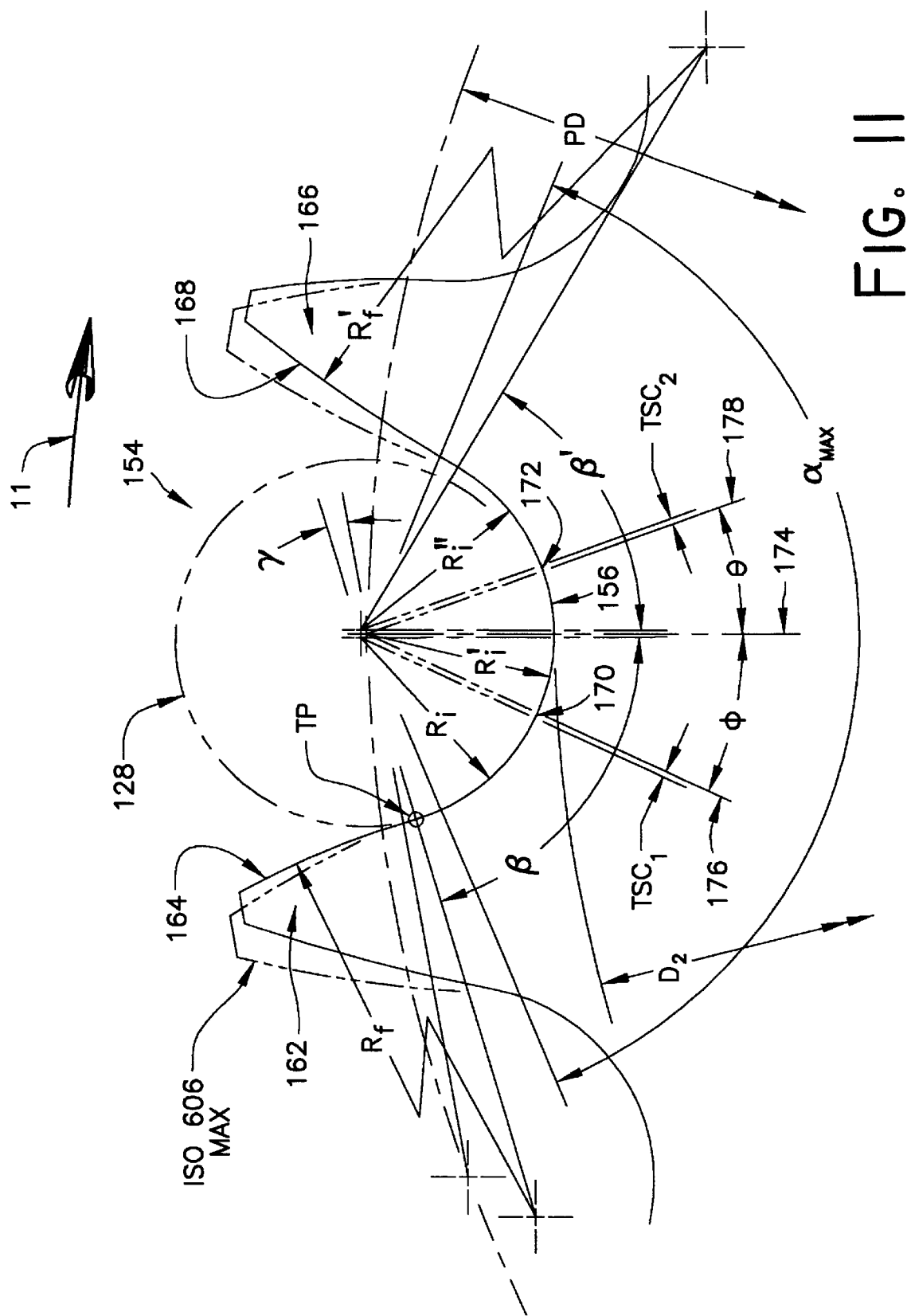
FIG. 11 illustrates the asymmetrical tooth space profile of FIG. 9 with tooth space clearance (TSC)

Referring now to FIG. 11, the asymmetrical tooth space 154 may incorporate tooth space clearance (TSC) in the same manner described in U.S. Pat. No. 5,876,295. That is, the root surface 156 may include one or more inclined flat surfaces 170, 172 that compensate for chain pitch elongation or chain wear by accommodating a specified degree of chain pitch elongation ΔP. In other words, tooth space clearance (TSC) enables rollers of a worn chain to be maintained in hard contact with one or more inclined root surfaces of the sprocket teeth. In addition, the inclined root surfaces 170, 172 facilitate reducing the radial reaction force thereby reducing the roller radial impact noise contribution to the overall noise level.

It should be appreciated that a shallow β' angle, along with the aforementioned tooth space clearance, helps maintain "hard" roller-sprocket contact for the rollers in the wrap.

In the embodiment of FIG. 11, the root radius $R_i$ is tangent to a radially outer end of the first inclined root surface 170. A second root radius $R_1'$ is tangent to a radially inner end of the inclined root surface 170 on the engaging side of the tooth space 154, and tangent to a radially inner end of the inclined root surface 172 on the disengaging side of the tooth space 154. A third root radius $R_i''$ is tangent to a radially outer end of the second inclined root surface 172 and tangent to a radially inner end of the disengaging flank radius $R_f'$ at a point defined by the roller seating angle β'.

It should be appreciated that the asymmetrical tooth spaces of the present invention may incorporate either one or both of the inclined root surfaces 170, 172, depending upon the desired asymmetrical tooth space geometry. Further, the inclined root surface 170 can be inclined at any angle φ necessary to satisfy a specific geometry or to compensate for a given amount of pitch elongation. As shown in FIG. 11, the inclined root surface angle φ is measured from a line 174 passing through the arc center of $R_i'$ and the sprocket center to a second line 176 which also passes through the arc center of $R_i'$ and the radially inner end of the inclined root surface 170. The inclined root surface 170 is normal to the line 176 and extends radially outward to where it is tangent to $R_1$. In the embodiment being described, the inclined root surface angle φ is preferably in the range of about 20° to about 35°.

Likewise, the inclined root surface 172 can be inclined at any angle θ necessary to satisfy a specific geometry or to compensate for a given amount of pitch elongation. The inclined root surface angle θ is measured from the line 174 passing through the arc center of $R_i'$ and the sprocket center to a second line 178 which also passes through the arc center of $R_i'$ and the radially inner end of the inclined root surface 172. The inclined root surface 172 is normal to the line 178 and extends radially outward to where it is tangent to $R_i''$. In the embodiment being described, the inclined root surface angle θ is preferably in the range of about 15° to about 30°.

Figure 12:
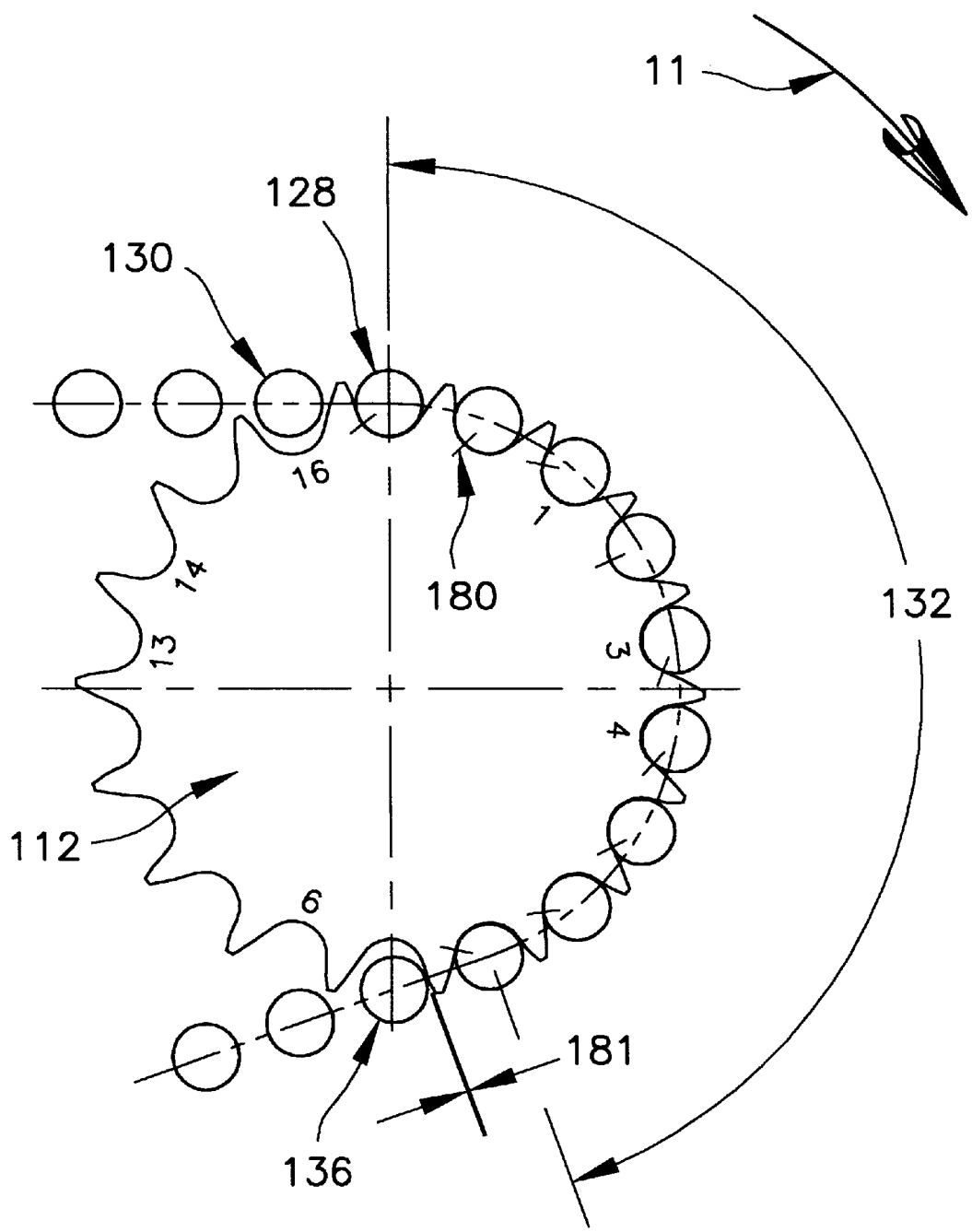
FIG. 12 illustrates the contact progression as the rollers travel around the sprocket wrap of the sprocket of FIG. 11.

FIG. 12 shows the chain wrap 132 for a sprocket 112 that incorporates tooth space clearance (TSC) in order to accommodate a specified degree of chain pitch elongation ΔP. In other words, the tooth space clearance TSC enables rollers of a worn chain to be maintained in hard contact with the inclined root surfaces of the sprocket teeth. The Lines 180 show the contact point for each of the rollers, as well as the contact progression as the rollers travel around the wrap. The inherent pitch mismatch between the sprocket and roller chain causes the rollers to climb up the coast side flank as the rollers progress around the sprocket wrap. With the addition of appreciable chordal pitch reduction, the extent to which the rollers climb up the coast side flank in increased.

It is important to note that chordal pitch reduction is required when the pressure angle γ has a negative value. Otherwise, roller 136 would interfere with the engaging flank (with a maximum material sprocket and a theoretical pitch [shortest] chain) as it exits the wrap 132 back into the span. Also, FIG. 12 illustrates why the shallow β' angle (i.e. $\leq \alpha_{min}/2$) and tooth space clearance TSC helps maintain "hard" roller-sprocket contact for the rollers in the wrap. That is, a disengaging flank roller seating angle β' having a maximum value which is less than or equal to $\alpha_{min}/2$ promotes faster separation when the roller leaves the sprocket and enters the span. This reduced angle β' also allows for the roller in a worn chain to ride up the coast flank surface to a less severe angle as the roller moves around the sprocket in the wrap.

Figure 13:
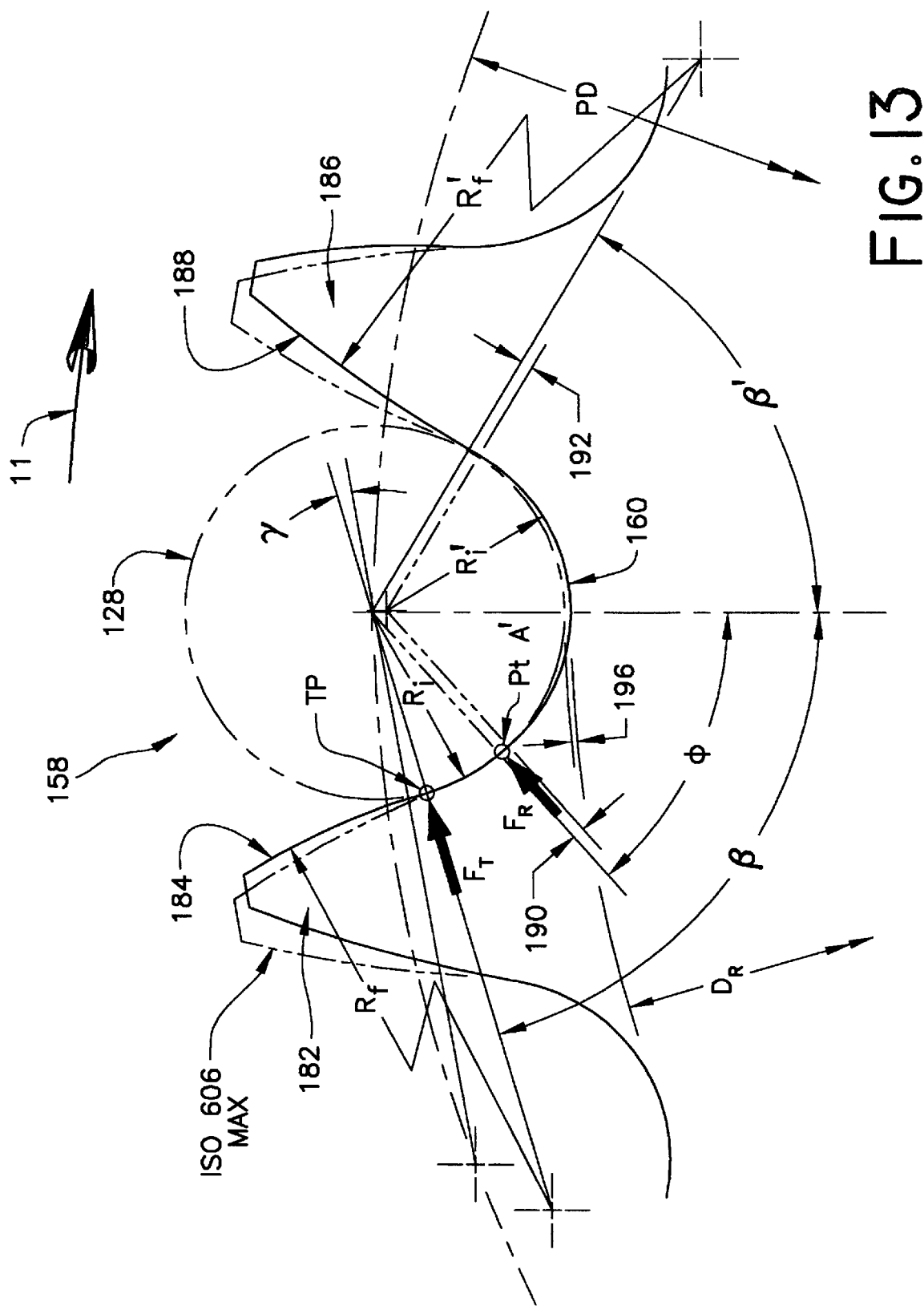
FIG. 13 illustrates a root-relieved asymmetrical tooth space profile for the random-engagement roller chain drive sprocket of FIG. 8.

Referring now to FIG. 13, the sprocket 112 also includes a third tooth 182 having an engaging side or flank 184, and a fourth tooth 186 having a disengaging side or flank 188.

The engaging flank 184 and disengaging flank 188 cooperate to define one of the tooth spaces 158 for receiving a roller associated with the chain 116, such as roller 128 (shown in phantom). Thus, the sprocket tooth 182 is necessarily classified as one of the teeth 152, and the sprocket tooth 186 can be classified as either one of the sprocket teeth 150 or 152.

The engaging flank 184 has a radius $R_f$ and the disengaging flank 188 has a radius $R_f'$. The root surface 160 incorporates root relief. That is, a first root radius $R_i$ of the root surface 160 is tangent to a radially inner end of the flank radius $R_f$ and tangent to a radially outer end of a flat surface 190. A second root radius $R_i'$ of the root surface 160 is tangent to a radially inner end of the flat surface 190 and tangent to a second flat surface 192. The disengaging flank radius $R_f'$ is tangent to a radially outer end of the second flat surface 192.

For this root relieved tooth space 158, root relief is defined as the clearance 196 of the relieved roller 128 to the relieved root diameter $D_R$ when the roller 128 contacts point A' at full mesh and its center is on the theoretical pitch diameter PD. The root relief is accomplished by the first flat surface 190 which is tangent to $R_i$ and extends radially inward, and the second flat surface 192 which is tangent to $R_f'$ and extends radially inward. Both flat surfaces 190, 192 are tangent to the root radius $R_i'$, which defines the root surface 160. $R_i'$ is necessarily equal to, or less than, one-half the roller diameter 128. The angle $\phi$, defined as the angle between a line connecting the arc center of $R_i$ and the sprocket center and a second line connecting the arc center of $R_i$ and the tangent point of $R_i$ and flat 190, and is preferably in the range of 40° to 50°. For the 18-tooth sprocket shown in FIG. 13, angle 100 is approximately 48°.

As with the asymmetrical tooth space 154 shown in FIG. 11, the root surface 160 of the asymmetrical tooth space 158 can additionally include either one or both inclined flat surfaces 170, 172 (FIG. 11). As mentioned, the inclined flat surfaces compensate for chain pitch elongation or chain wear by accommodating a specified degree of chain pitch elongation ΔP. In addition, the inclined root surface 170 facilitates reducing the radial reaction force thereby reducing the roller radial impact noise contribution to the overall noise level.

Figure 13A:
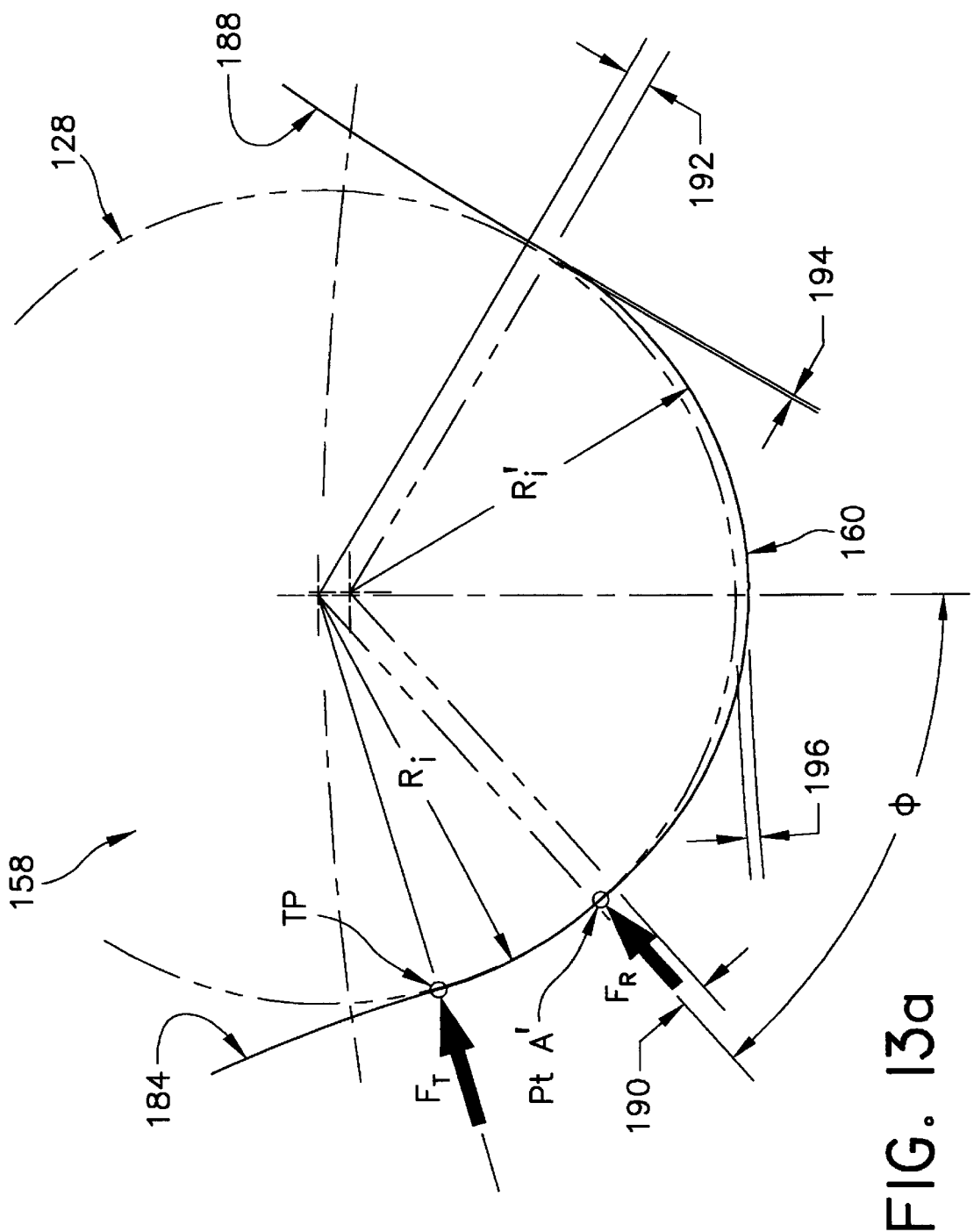
FIG. 13a illustrates a roller at the onset of meshing with the asymmetrical tooth space profile of FIG. 13.
Figure 13B:
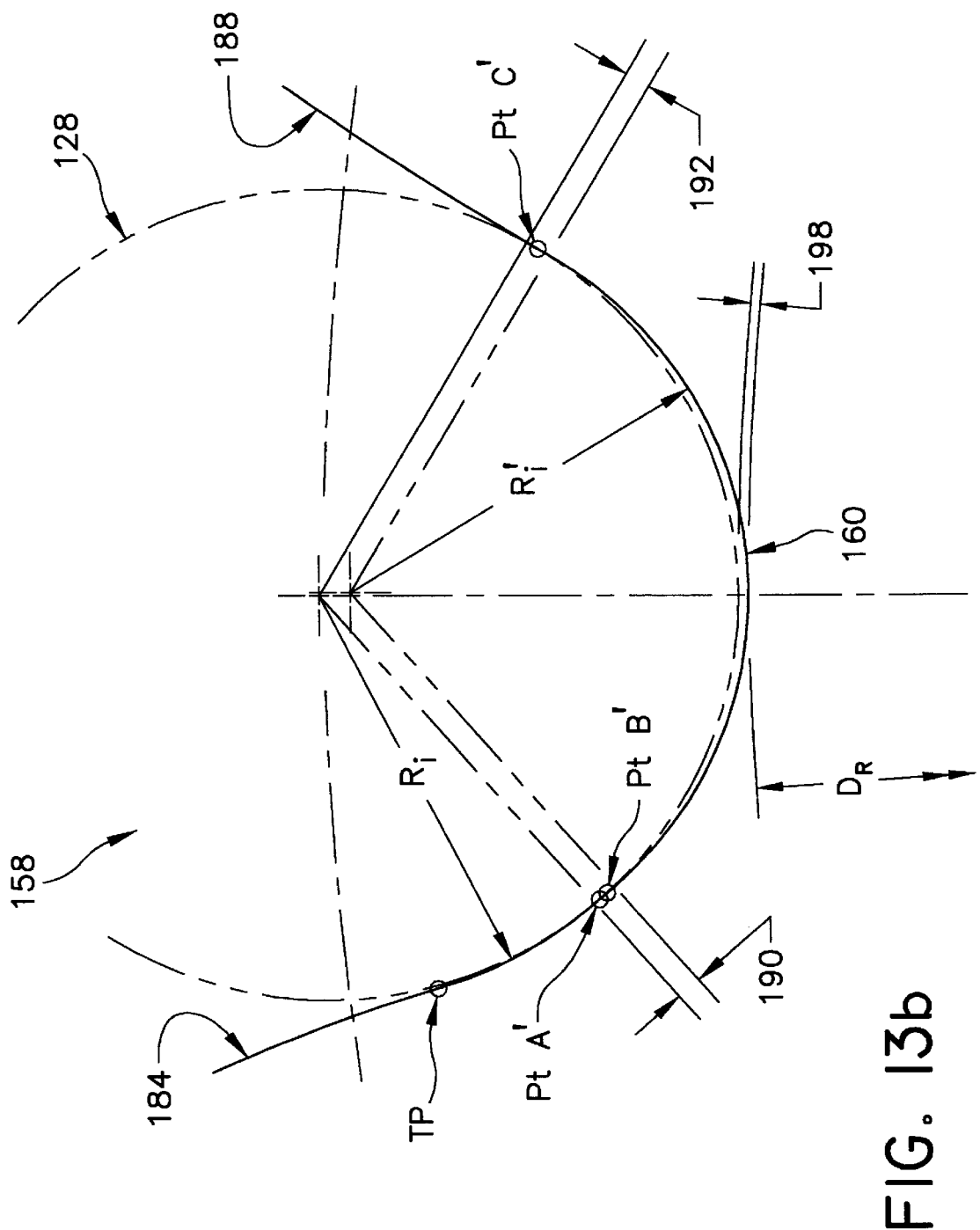
FIG. 13b shows the sprocket of FIG. 13a rotated in a clockwise direction until the instant that the roller moves out of driving contact and bridges the relieved root surface of the sprocket.

FIG. 13a illustrates the roller clearance 194 to the disengaging flank for the full mesh position of the roller 128 at point A'. Referring to FIG. 13b, roller 128 is prohibited from contacting the root surface 160 as illustrated by the roller-root clearance 198, or root relief, at the root diameter $D_R$ when roller 128 is moved radially inward to contact the lower flanks. As shown, the roller 128 can contact only the lower engaging and disengaging flanks.

Figure 14:
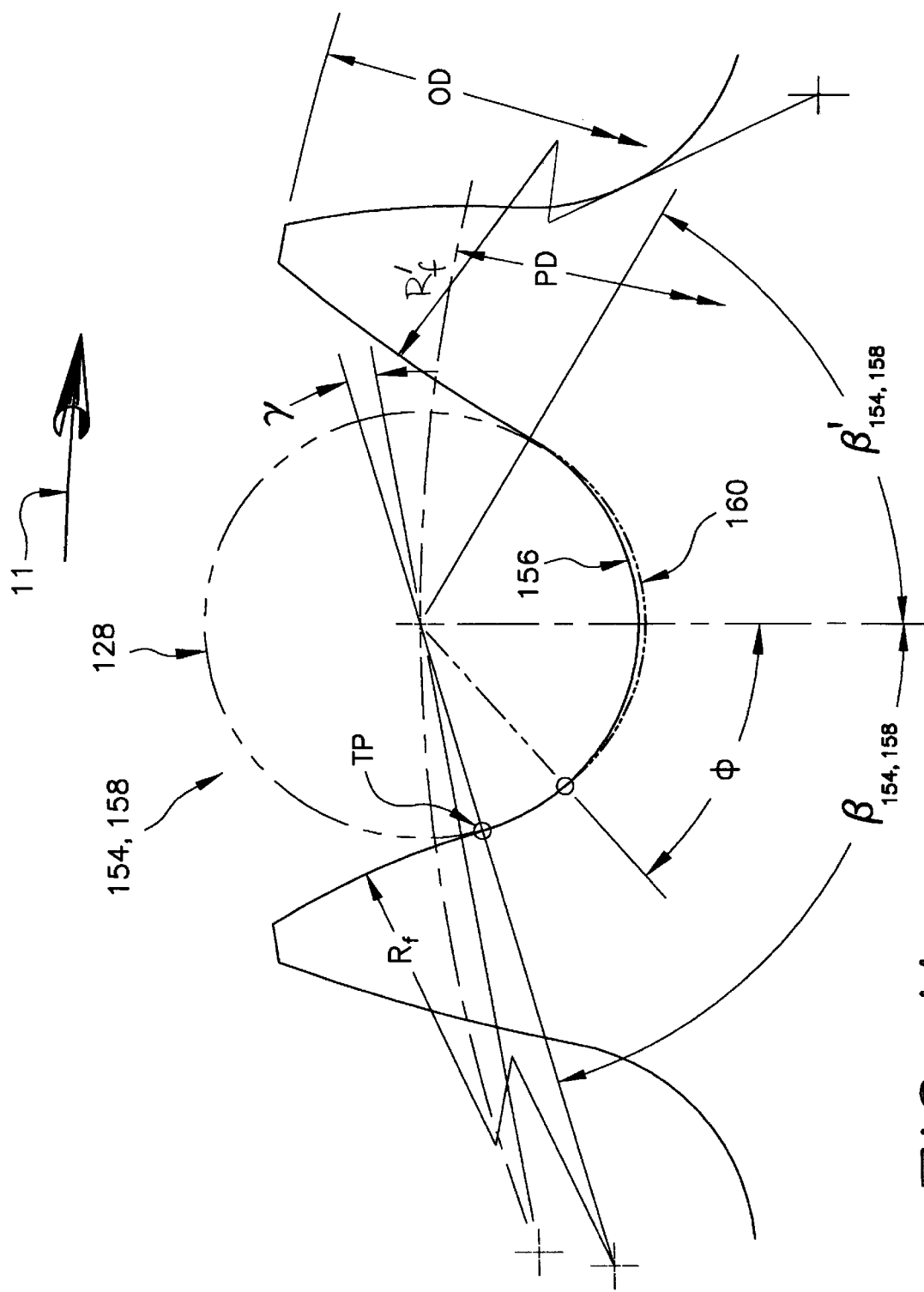
FIG. 14 illustrates the asymmetrical tooth space profile of FIG. 9 overlaid with the asymmetrical tooth space profile of FIG. 13.

FIG. 14 illustrates the asymmetrical tooth space 154 overlaid on the root-relieved asymmetrical tooth space 158. The roller seating angles β and β' for the tooth profile 154 is substantially equal to the roller seating angles β and β' for the tooth profile 158. Further, the asymmetrical tooth space 154 is substantially identical to the asymmetrical tooth space 158 from the point radially outward of the radially outer end of the flat surface 190, and from the point radially outward of the radially outer end of the flat surface 192 (i.e., the radius $R_f'$ of the disengaging flank 168 is substantially equal to the radius $R_f'$ of the disengaging flank 188).

Figure 15:
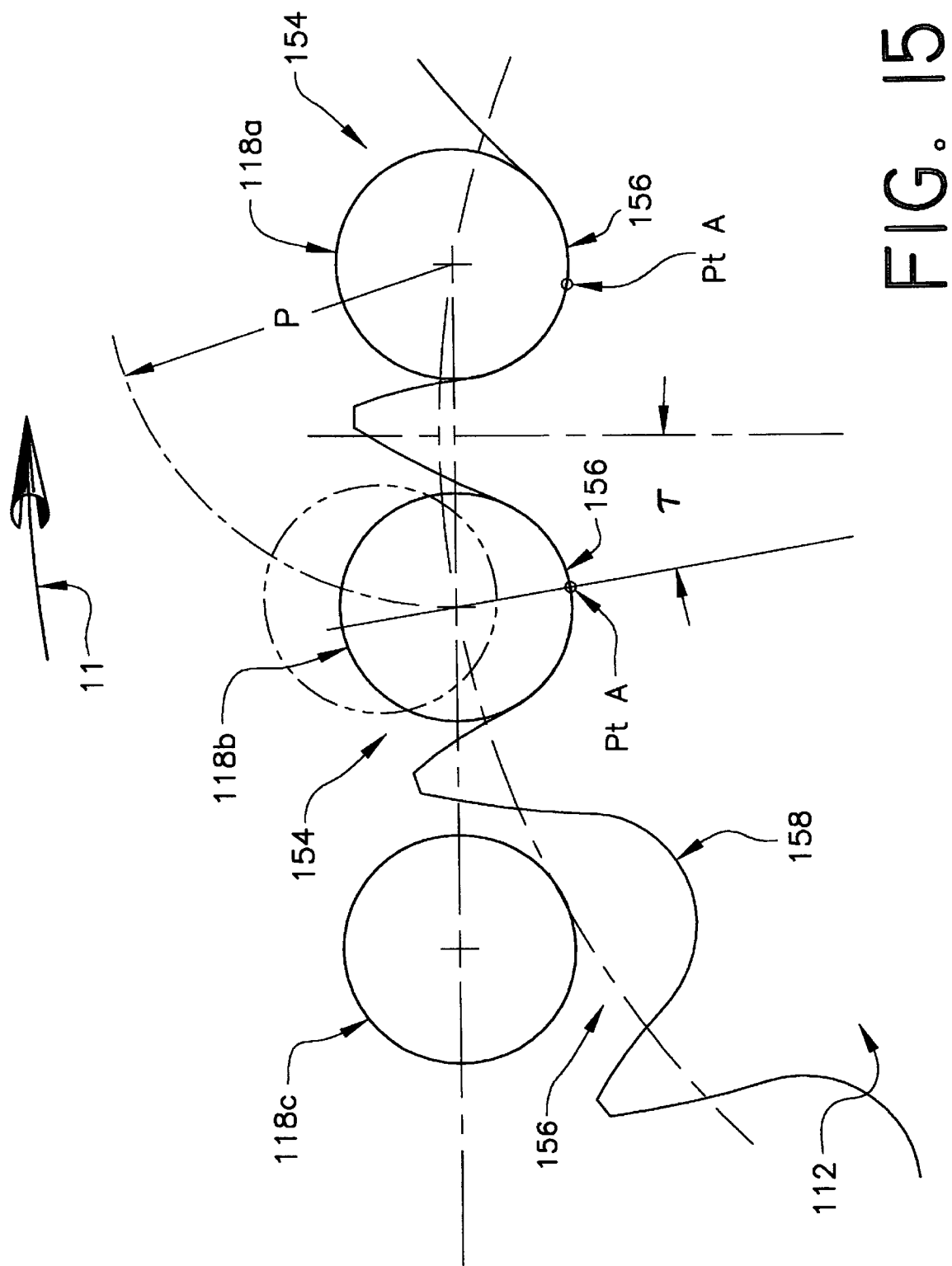
FIG. 15 illustrates the sprocket of FIG. 8 with a first roller seated on the root diameter at Point A, a second roller at the onset of meshing contact at Point A in its tooth space, and a third roller about to mesh with the drive sprocket.
Figure 15A:
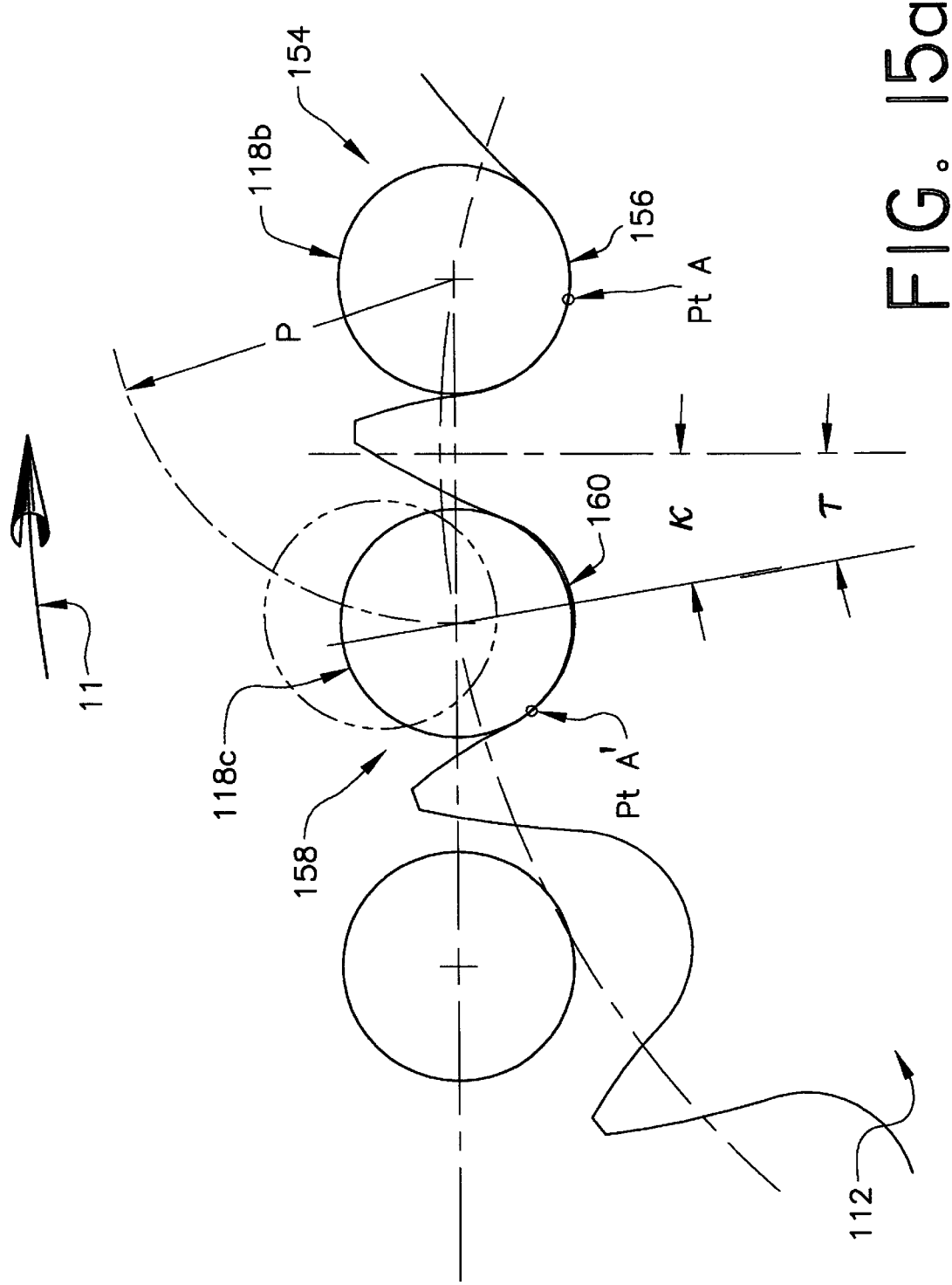
FIG. 15a illustrates the sprocket of FIG. 15 rotated in a clockwise direction until the instant of meshing contact of the third roller in its root relieved tooth space at Point A'.

FIGS. 15 and 15a illustrate the meshing delay between the tooth profiles 154, 158. In particular, FIG. 15 illustrates the sprocket 112 of FIG. 8 with a first roller 118a seated on the root diameter at Point A of a tooth space 154, a second roller 118b at the onset of meshing contact at Point A in a second tooth space 154, and a third roller 118c about to mesh with the drive sprocket in a tooth space 158. FIG. 15a illustrates the sprocket of FIG. 15 rotated in a clockwise direction until the instant of meshing contact of the third roller 118c in its root relieved tooth space 158 at Point A'. The sprocket 212 must rotate through an angle τ for roller 118b to move from its initial contact position at point A to fully seat in driving contact with the tooth profile 154 at a 12 o'clock position.

With reference now to FIG. 15a, the sprocket 112 is shown rotated in a clockwise direction until roller 118c is at the instant of initial contact at Point A' of the tooth profile 158. It is evident that the sprocket 112 rotated through an additional angle τ-κ in order for the initial contact to occur at Point A'. Thus, the initial contact at Point A' occurs at a point later in time than if the initial contact were to occur at Point A. The sprocket 112 must now rotate through a smaller angle κ for roller 118c to fully seat in driving contact with the tooth profile 158 at a 12 o'clock position.

Figure 16:
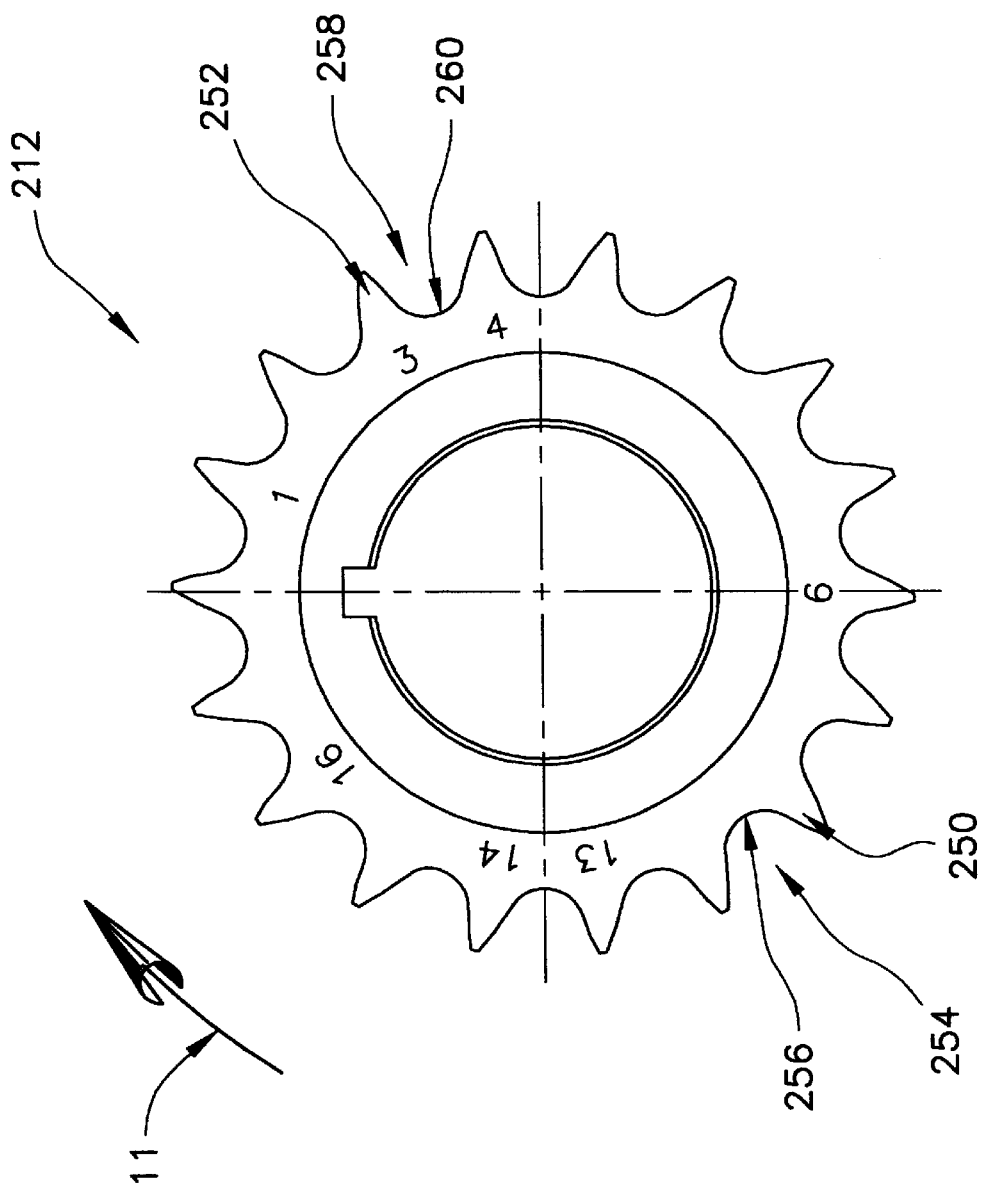
FIG. 16 illustrates a second embodiment of a random-engagement roller chain drive sprocket of the drive system of FIG. 7.

With reference now to FIG. 16, a second embodiment of a random-engagement roller chain drive sprocket 212 is shown. As with the first random-engagement roller chain drive sprocket 112, the sprocket 212 is shown as an 18-tooth sprocket. However, the sprocket 212 may have more or less teeth, as desired. The sprocket 212 includes a first number of sprocket teeth 250 and a second number of sprocket teeth 252 (numbered as sprocket teeth 1, 3, 4, 9, 13, 14, and 16). In the embodiment being described, there are eleven sprocket teeth 250 and seven sprocket teeth 252 arbitrarily positioned around the sprocket 212. However, it should be appreciated that the number and position of each type of sprocket tooth can vary without departing from the scope of the invention.

The sprocket teeth 250 each include an engaging side or flank profile that cooperates with a disengaging side or flank profile of an adjacent tooth (in a clockwise-manner) to form a first asymmetrical tooth space 254 having a root surface 256. The sprocket teeth 252 each include and engaging side or flank profile that cooperates with a disengaging side or flank profile of an adjacent tooth (in a clockwise-manner) to form a second asymmetrical tooth space 258 having a relived root surface 260. As described further below, the first and second groups of sprocket teeth 250, 252 cooperate to reduce chain drive system noise levels below a noise level which either tooth profile used alone would produce.

Figure 17:
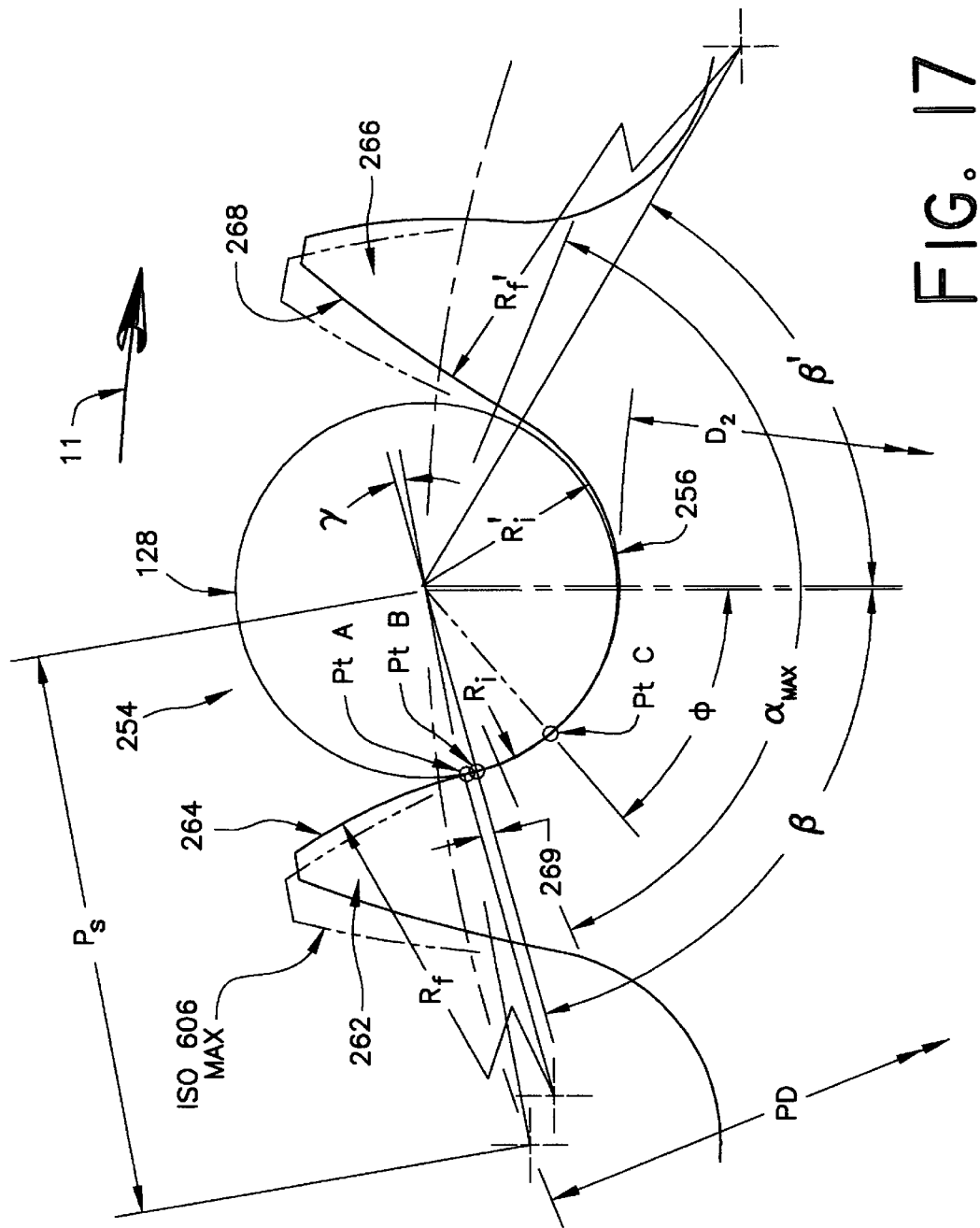
FIG. 17 illustrates a first asymmetrical tooth space profile for the random-engagement roller chain drive sprocket of FIG. 16.

Referring now to FIG. 17 the sprocket 212 includes a first tooth 262 having an engaging side or flank 264, and a second tooth 266 having a disengaging side or flank 268. The engaging flank 264 and disengaging flank 268 cooperate to define one of the tooth spaces 254 for receiving a roller associated with the chain 116, such as roller 128. Thus, the sprocket tooth 262 is necessarily classified as one of the teeth 250, and the sprocket tooth 266 can be classified as either one of the sprocket teeth 250 or 252.

The engaging roller 128 has a roller diameter $D_1$, and is shown fully seated in two-point contact within the tooth space 254. More particularly, the engaging roller 128 contacts two lines B and C that extend axially along the engaging flank surface or face (i.e., in a direction orthogonal to the plane of the drawings) when fully seated in driving contact within the tooth space 254. To facilitate a description of the two-point contact, the lines B and C are hereafter shown and referred to as contact points within the tooth space. The angle $\phi$ is an angle measured from a line connecting the arc center of $R_i'$ and the sprocket center to a second line which also passes through the arc center of $R_i'$ and point C. Angle $\phi$ may be in the range of 25° and 50°. For the 18-tooth sprocket shown in FIG. 17, angle $\phi$ is approximately 45°.

Figure 17A:
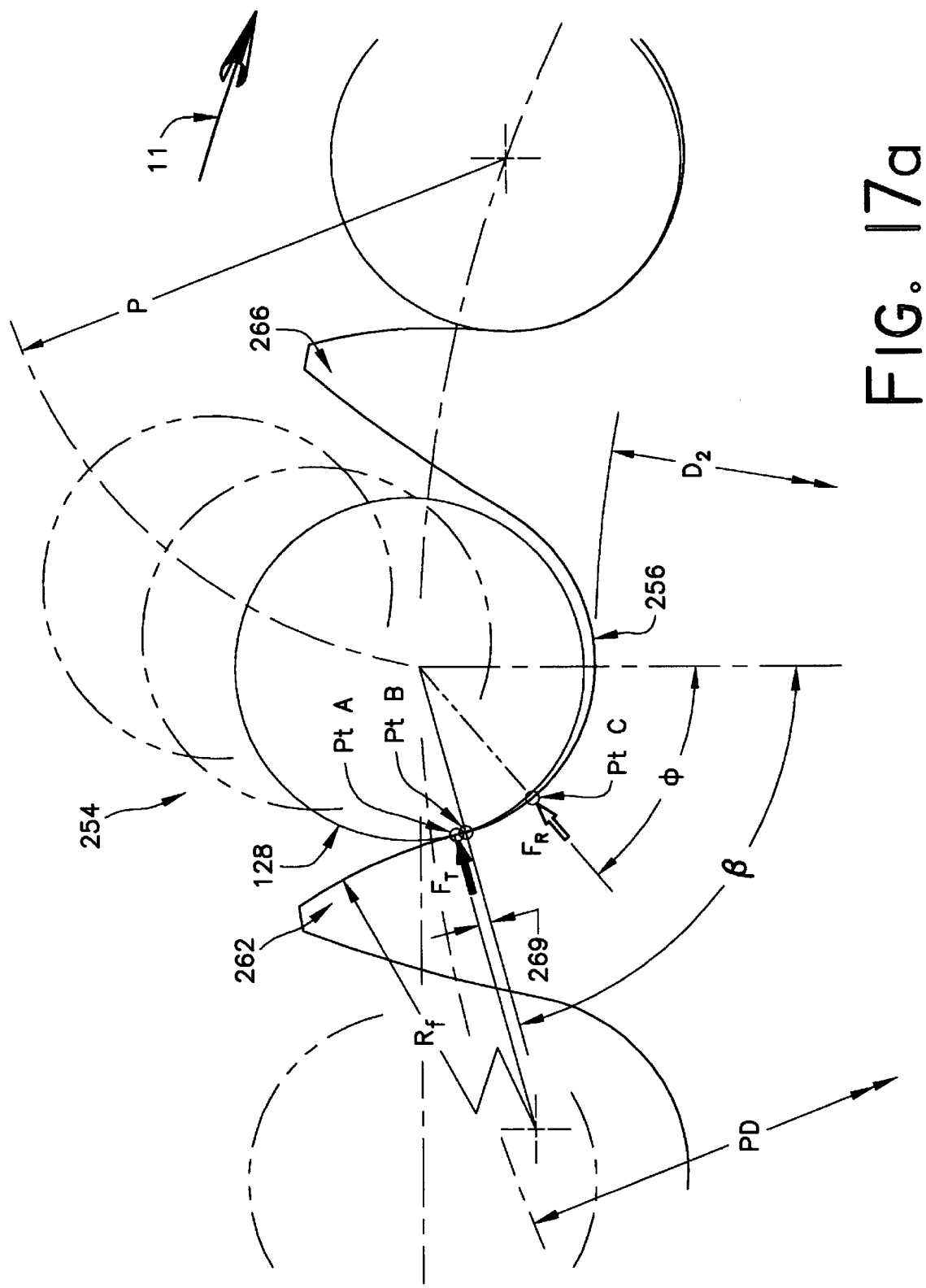
FIG. 17a shows an engagement path (phantom) and a roller (solid) at the instant of initial contact as the sprocket of FIG. 16 rotates in a clockwise direction.
Figure 17B:
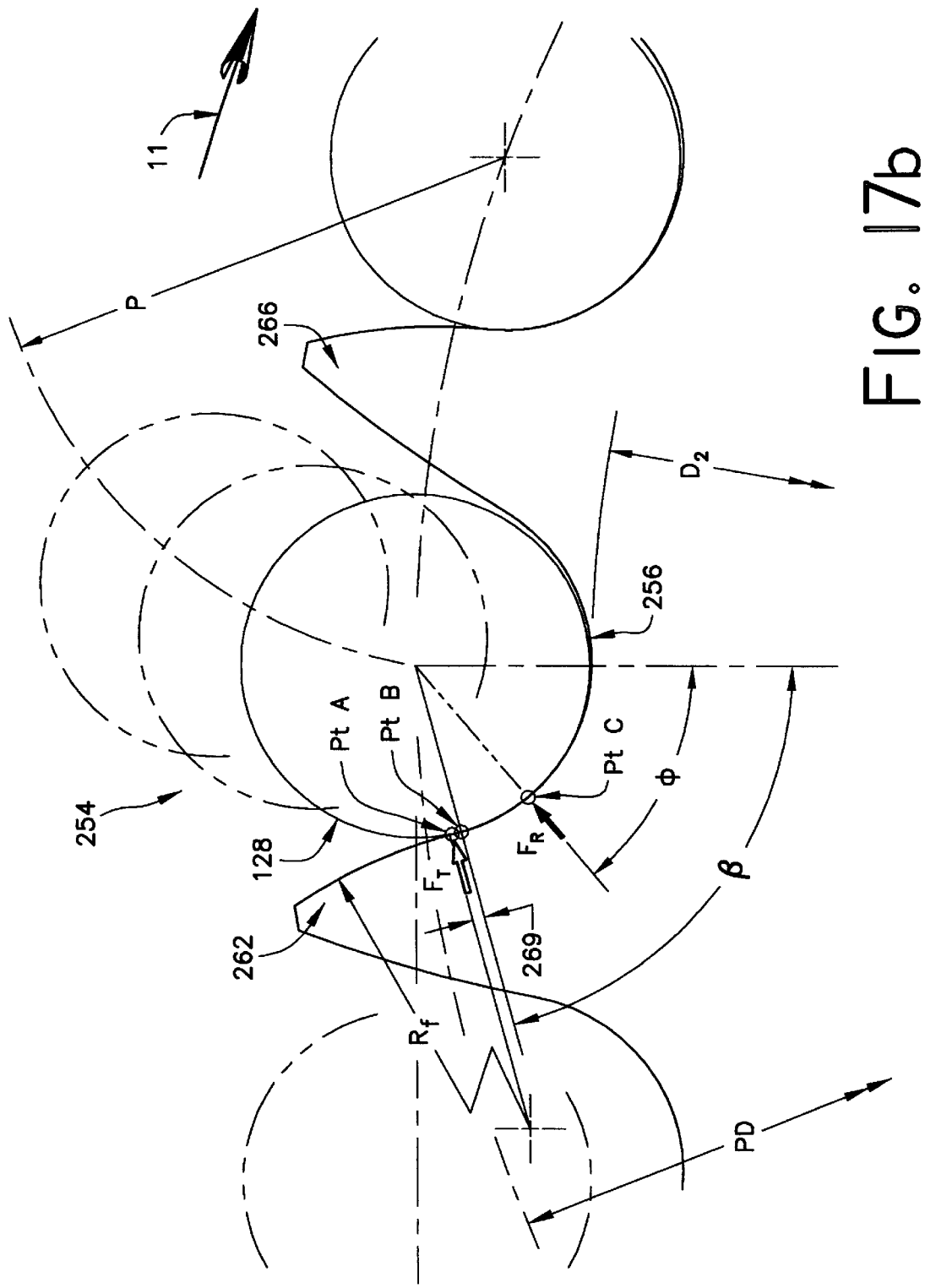
FIG. 17b shows the sprocket of FIG. 17a rotated in a clockwise direction until the instant that the roller fully seats in two-point contact with the sprocket.
Figure 17C:
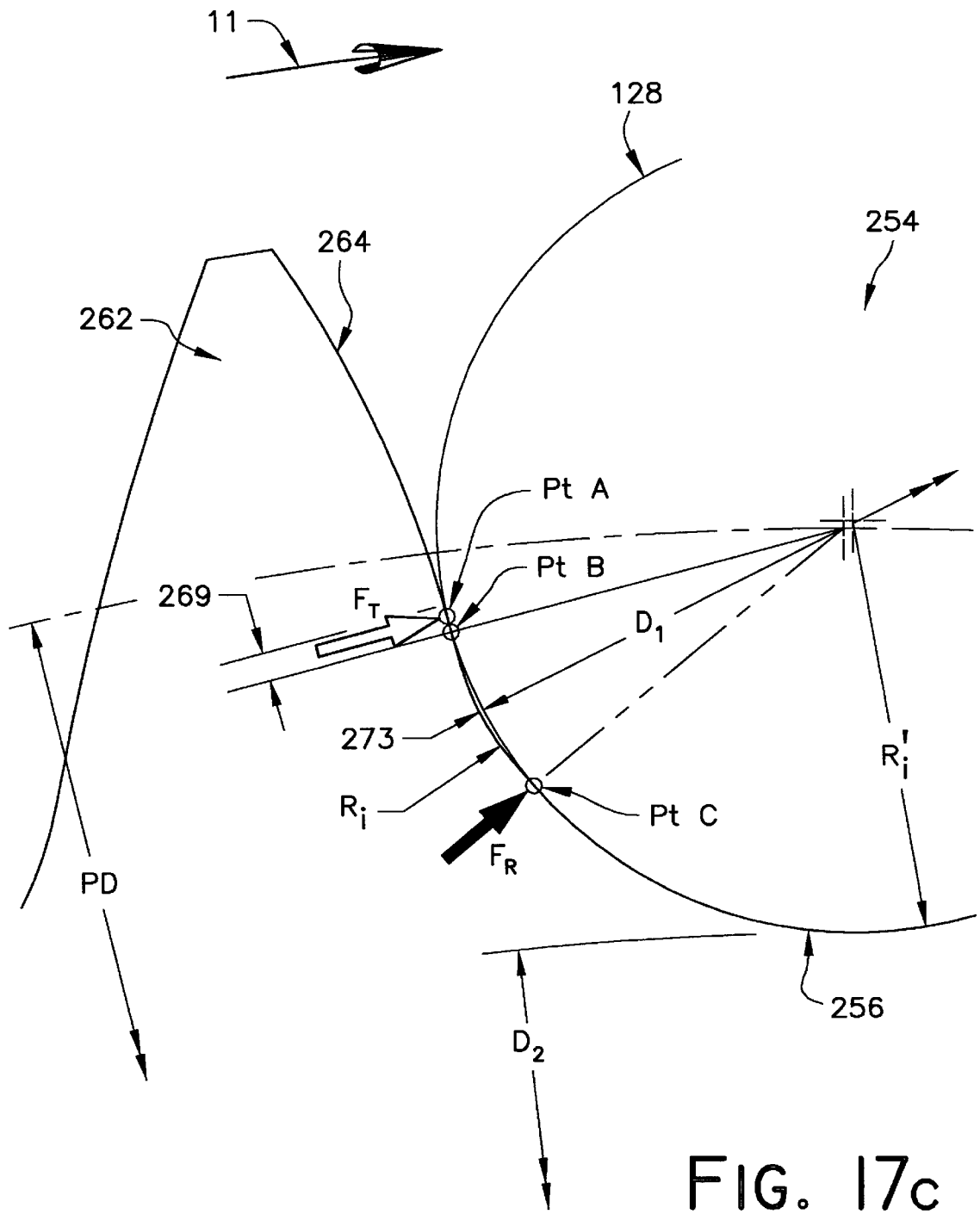
FIG. 17c is an enlarged view of FIG. 17b showing the roller fully seated in two-point contact with the sprocket.

The engaging flank 264 has a radius $R_f$ that is tangent to a radially outer end of a flank flat 269. A first root surface defined by the radius $R_i$ is tangent to a radially inner end of the flank flat 269 and a radially outer end of a non-functional flat (not shown) that extends radially outward from Point C. More particularly, as shown in FIG. 17c, a maximum value for the root radius $R_i$ must be equal to, or less than, a minimum roller radius $0.5D_1$ in order to insure two-point/line contact at Points B and C. As a result of $R_i \leq 0.5D_1$, a small clearance 273 is defined between the root surface 256 and the roller 128 when the roller is seated at Points B and C. And, a first non-functional flat surface (not shown) extends between Point B and a radially outer end of the root surface defined by the radius $R_i$, and a second non-functional flat surface extends between Point C and a radially inner end of the root surface defined by the radius $R_i$.

The first non-functional flat surface is contiguous with the flank flat 269. That is, a first portion of the flank flat 269 extends radially outward from Point B to facilitate "staged" roller-sprocket meshing (described further below), and a second, non-functional, portion of the flank flat 269 extends radially inward of Point B and cooperates with the non-functional flat extending radially outward from Point C to cause the roller to seat in two-point contact at Points B and C.

A second root surface defined by the radius $R_i'$ is tangent to a radially inner end of the non-functional flat at Point C and tangent to a disengaging side or flank defined by the radius $R_f'$.

The location of the flank flat 269 is Determined by the angle $\beta$, with the flat orientation being normal or perpendicular to a line that passes through Point B and the center of roller 128 when the roller is contacting the sprocket at Points B and C. The length of the flank flat portion that extends radially outward from Point B affects a time delay between an initial tangential impact between sprocket 212 and roller 128 at a first contact Point A along the flank flat 269 (FIG. 17a), and a subsequent radial impact at Point C (FIGS. 17b and 17c). It should be appreciated that the pressure angle $\gamma$, the amount of pitch mismatch between the chain and the sprocket, and the length of the flank flat can be varied to achieve a desired initial roller contact Point A at the onset of roller-sprocket meshing.

The initial tangential contact occurs at Point A at the onset of mesh, with its related impact force $F_T$. The roller 128 is believed to stay in hard contact with the flank flat 269 as the sprocket rotation moves the roller into full mesh with its resulting radial contact at Point C. The radial impact force $F_R$ does not occur until the sprocket has rotated sufficiently to bring roller 128 into radial contact at Point C. That is, the force vector $F_R$ is shown as an outline in FIG. 17a because it has not yet occurred. However, the force vector $F_R$ is shown in solid in FIGS. 17b and 17c to indicate the occurrence of the radial impact. Likewise, the tangential impact force vector $F_T$ is shown in solid in FIG. 17a to indicate the occurrence of the tangential impact, and is shown as an outline in FIGS. 17b and 17c to indicate the previous occurrence.

Thus, the radial impact force $F_R$ occurs at the instant of full mesh. The taut strand load transfer to a the meshing roller 128, as illustrated by arrows 124 in FIG. 7, is also considered to be complete at full mesh. At the instant of the radial collision by roller 128 at Point C, with its resultant radial impact force $F_R$, the tangential impact force of $F_T$ has already occurred and is no longer a factor. The time delay ("staged" engagement) between the tangential and radial roller-sprocket collisions effectively spreads the impact energy occurring during the meshing process over a greater time interval, thereby reducing its contribution to the generated noise level at mesh frequency. Additionally, it is believed that the present asymmetrical sprocket tooth profile beneficially permits a more gradual taut strand load transfer from a fully engaged roller 128 to a meshing roller 130 (FIG. 7) as the meshing roller 130 moves from its Point A initial mesh to its full two-point mesh position at Points B and C.

With reference again to FIG. 7, the chordal rise (and fall) with the asymmetrical profile 254 is the perpendicular displacement of the center of roller 130 from the taut strand 122 path as it moves from its initial meshing contact Point A to the mesh position presently occupied by roller 128. It is believed that roller 130 will stay in hard contact with the engaging flank 264 as the roller moves from initial tangential contact to full mesh, and accordingly, the chordal rise is reduced as the distance between Points A and B is increased.

The flank (tangential) contact always occurs first, with radial contact then occurring always at Point C regardless of chain pitch length. In contrast, with known tooth space forms (e.g., ISO-606 compliant and asymmetrical) incorporating single-point contact (e.g. single line contact), an engaging roller must move to a driving position proximate the tangency point TP after making the initial radial contact. The pressure angles $\gamma$ therefore assume that the engaging roller will contact at the flank radius/root radius tangent point. Thus, the meshing contact location of the known single point/line tooth space forms is pitch "sensitive" to determine where the radial impact as well as tangential impact will occur.

As with the asymmetrical tooth profile, associated with the sprocket 112, the engaging flank roller seating angle $\beta$ and the disengaging flank roller seating angle $\beta'$ replace the ISO-606 roller seating angle $\alpha$ (ISO profile shown in phantom) and comply with equations 3–5 above. The pressure angle $\gamma$ is a function of the engaging flank roller seating angle $\beta$. That is, as $\beta$ increases, $\gamma$ decreases. It should be appreciated that reducing the engaging flank pressure angle $\gamma$ reduces the tangential impact force component $F_T$ (FIG. 17a) and thus the tangential impact noise contribution to the overall noise level at the onset of engagement. That is, the impact force $F_T$ is a function of the impact velocity which in turn is related to pressure angle $\gamma$.

As the pressure angle $\gamma$ is reduced, it provides a corresponding reduction in the impact velocity between the chain and the sprocket at the onset of meshing. A minimum pressure angle $\gamma$ also facilitates a greater separation or distance between the contact points A and B to further increase or maximize engagement "staging". In the preferred embodiment, the engaging flank pressure angle $\gamma$ is in the range of about −2.0° to about +5° to optimize the staged impact between the roller and the sprocket.

In the embodiment being described, roller seating angle $\beta$ is greater than ISO $\alpha_{max}/2$ at a maximum material condition and $\beta$ can be adjusted until a desired engaging flank pressure angle $\gamma$ is achieved. However, the engaging flank roller seating angle $\beta$ may be beneficially adjusted so as to provide any engaging flank pressure angle $\gamma$ having a value less than the minimum ISO-606 pressure angle.

Related U.S. Pat. No. 08/879,157 (Attorney Docket No. CYS 2 039) is assigned to the assignee of the present invention and discloses various asymmetrical tooth space profiles where one or both of the engaging flank roller seating angle $\beta$ and the disengaging flank roller seating angle $\beta'$ are within the ISO-606 roller seating angle $\alpha$ tolerance range, and/or are outside of the ISO-606 roller seating angle $\alpha$ tolerance range. U.S. Pat. No. 08/879,157 is hereby incorporated by reference for all that it illustrates and discloses.

As with the asymmetrical tooth spaces 154 and 156 (FIGS. 11 and 13, respectively), the root surface 256 of the asymmetrical tooth space 254 can additionally include either one or both inclined flat surfaces 170, 172 (FIG. 11). As mentioned, the inclined flat surfaces compensate for chain pitch elongation or chain wear by accommodating a specified degree of chain pitch elongation ΔP. In addition, the inclined root surfaces 170, 172 facilitate reducing the radial reaction force thereby reducing the roller radial impact noise contribution to the overall noise level.

Figure 18:
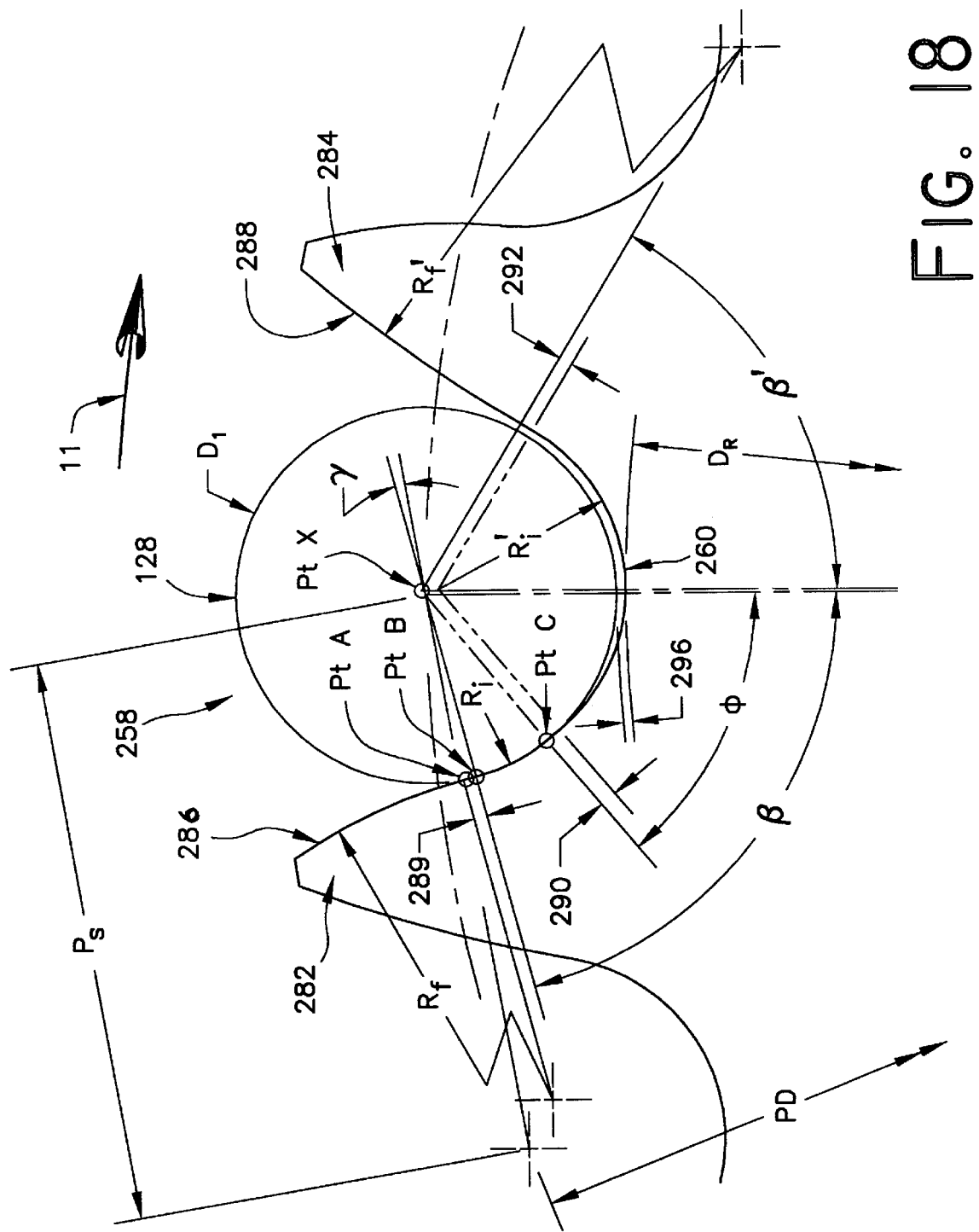
FIG. 18 illustrates a root-relieved asymmetrical tooth space profile for the random-engagement roller chain drive sprocket of FIG. 16 with a roller at the instant of initial contact with the sprocket.

Referring now to FIG. 18, the sprocket 212 (FIG. 16) also includes a third tooth 282 having an engaging side or flank 284, and a fourth tooth 286 having a Disengaging side or flank 288. The engaging flank 284 and disengaging flank 288 cooperate to define one of the tooth spaces 258 for receiving a roller associated with the chain 116, such as roller 128. Thus, the sprocket tooth 282 is necessarily classified as one of the teeth 252, and the sprocket tooth 286 can be classified as either one of the sprocket teeth 250 or 252.

The engaging roller 128 has a roller diameter $D_1$, and is shown fully seated in two-point contact within the tooth space 258. More particularly, the engaging roller 128 contacts two lines B and C that extend axially along the engaging flank surface or face when fully seated in driving contact within the tooth space 258.

Figure 18A:
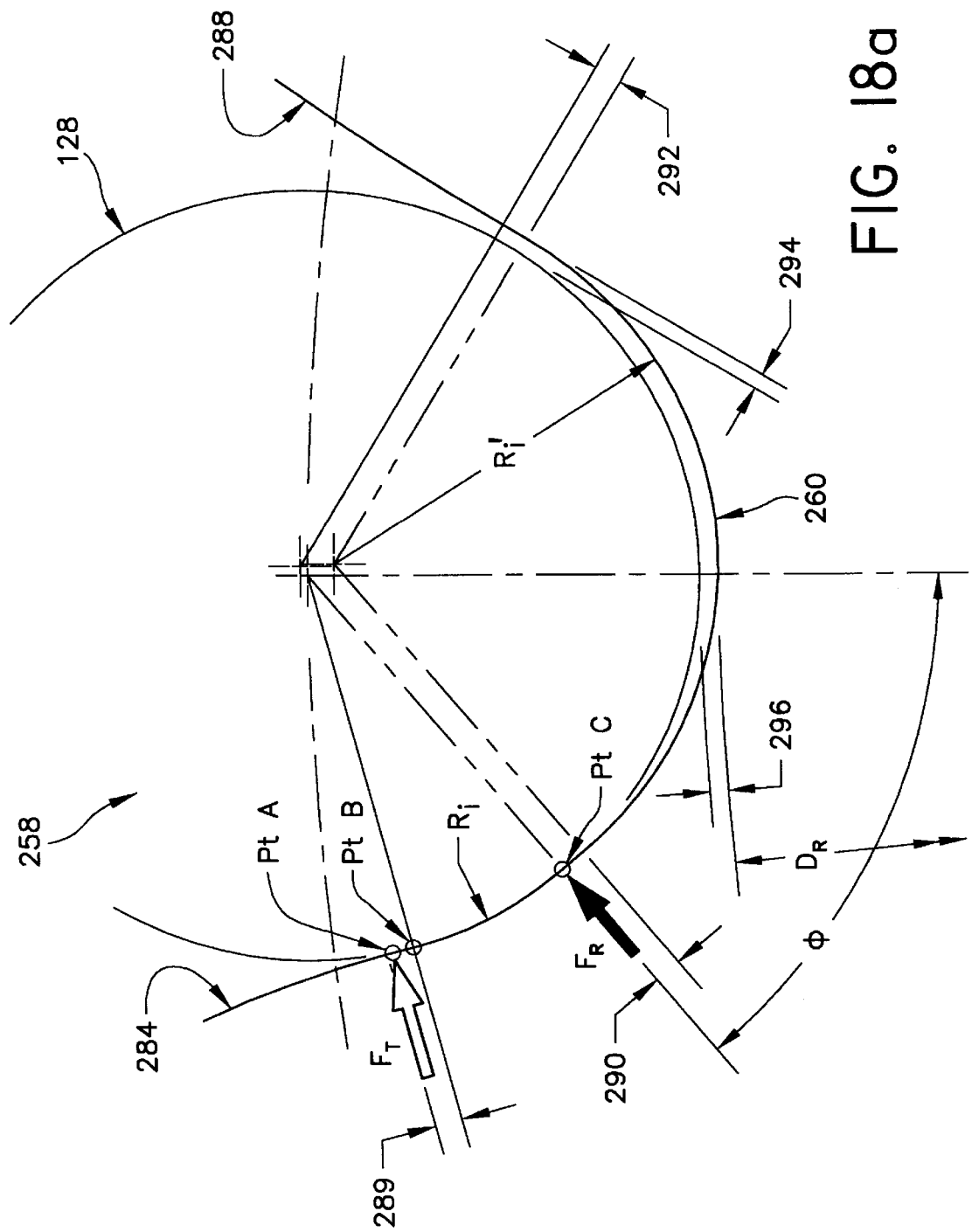
FIG. 18a is an enlarged view of the root-relieved asymmetrical tooth space profile of FIG. 18 at the instant that the roller fully seats in two-point driving contact with the sprocket.

The engaging flank 284 has a radius $R_f$ that is tangent to a radially outer end of a flank flat 289. A first root surface, defined by radius $R_i$, is tangent to a radially inner end of the flank flat 289 and a radially outer end of a non-functional flat (not shown) that extends radially outward from Point C. More particularly, as shown in FIG. 18a, a maximum value for the root radius $R_i$ must be equal to, or less than, a minimum roller radius $0.5D_1$ in order to insure two-point/line contact at Points B and C. As a result of $R_i \leq 0.5D_1$, a small clearance 293 is defined between the root surface 260 and the roller 128 when the roller is seated at Points B and C. And, a first non-functional flat surface (not shown) extends between Point B and a radially outer end of the root surface defined by radius $R_i$, and a second non-functional flat surface extends between Point. C and a radially inner end of the root surface defined by radius $R_i$.

The first non-functional flat surface is contiguous with the flank flat 289. That is, a first portion of the flank flat 289 extends radially outward from Point B to facilitate "staged" roller-sprocket meshing (as previously described). A second, non-functional, portion of the flank flat 289 extends radially inward of Point B and cooperates with the non-functional flat extending radially outward from Point C to cause the roller to seat in two-point contact at Points B and C.

It should be appreciated that from Point C radially outwardly, the asymmetrical tooth space 258 is identical to the asymmetrical tooth space 254 of FIG. 17. That is, the roller seating angles β for each profile 254, 258 are the same as well as the angles ϕ. Thus, staged roller-sprocket meshing occurs at the same points A, B and C for both asymmetrical tooth profiles 254, 258. It should be appreciated that Angle ϕ is substantially identical for both tooth profiles 254, 258 and is determined by the asymmetrical tooth space 254.

The root surface 260 incorporates root relief. That is, a first flat surface 290 extends radially inward from Point C. A second portion of the root surface 260, defined by the radius $R_i'$, is tangent to a radially inner end of the flat surface 290 and is tangent to a radially inner end of a second flat surface 292. The disengaging flank, defined by the radius $R_f'$, is tangent to a radially outer end of the second flat surface 292.

It should be appreciated that the second non-functional flat surface (radially outward of Point C) is contiguous with the flat surface 290. That is, a first portion of the flat surface 290 extends radially outward from Point C and cooperates with the non-functional flat extending radially inward from Point B (associated with the flank flat 289) to cause the roller to seat in two-point contact at Points B and C. A second portion of the flat surface 290 extends radially inward of Point C and cooperates with the second flat surface 292 to provide root relief.

Root relief is defined as clearance of the roller 128 to the relieved root surface 260 when the roller 128 is seated in full mesh at Points B and C. For the root relieved tooth space 258, the roller 128 contacts point B at full mesh when its center is on the theoretical pitch diameter PD. The second root radius $R_i'$ is necessarily equal to, or less than, one-half the roller diameter 128.

The location of the flank flat 289 is defined by the angle β in the same manner as previously described with reference to the flank flat 269 associated with the tooth space 254 (FIG. 17). Further, as with the asymmetrical tooth space 254 shown in FIG. 17, the root surface 260 of the asymmetrical tooth space 258 can incorporate tooth space clearance (TSC) by including either one or both inclined flat surfaces 170, 172 (FIG. 11).

Figure 18B:
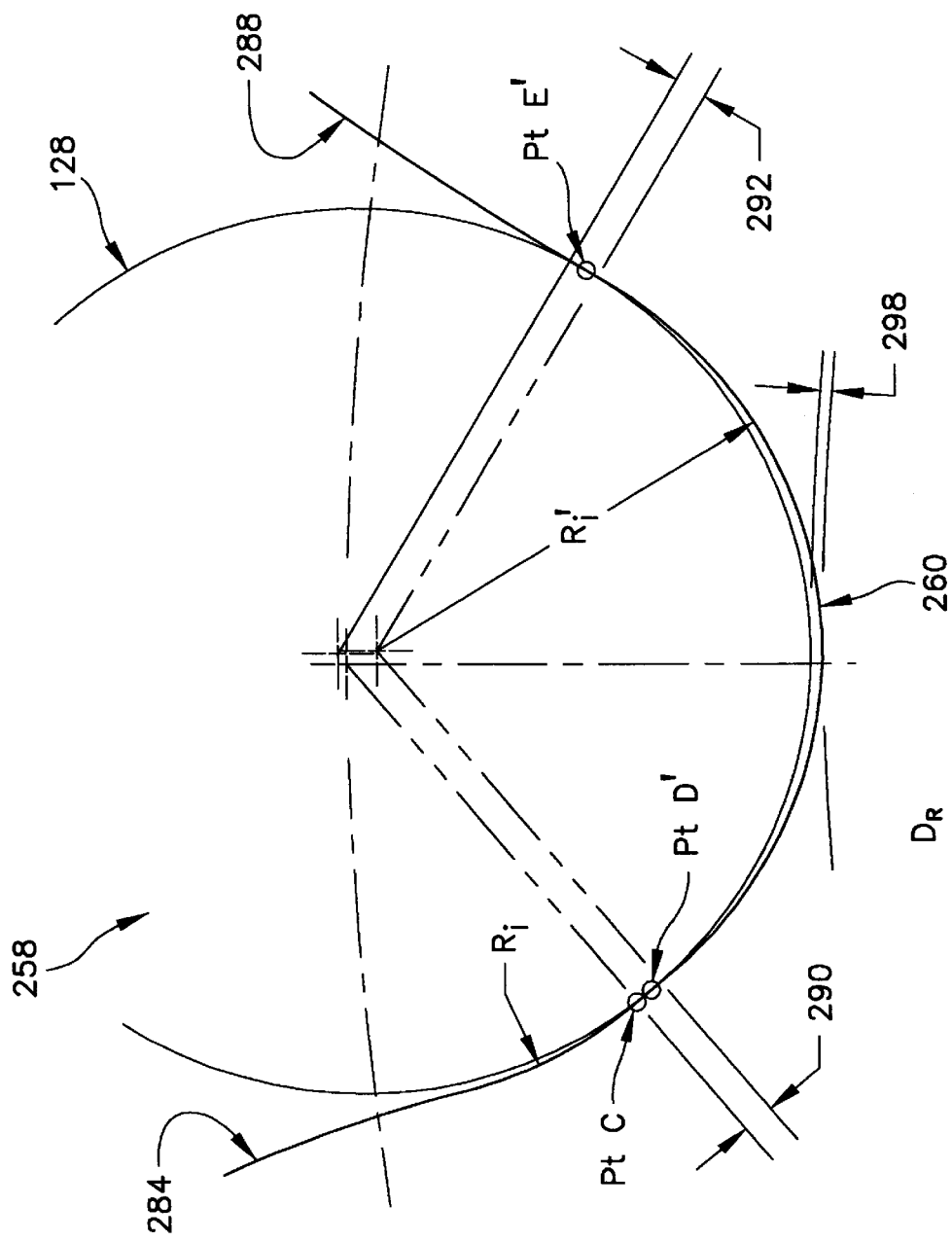
FIG. 18b shows the sprocket of FIG. 18a rotated in a clockwise direction until the instant that the roller moves out of driving contact and bridges the relieved root surface of the sprocket.

FIG. 18a illustrates the roller clearance 294 to the disengaging flank for the full mesh position of the roller 128 at points B and C. FIG. 18a also illustrates the root relief clearance 296 when the roller 128 is seated in the same full mesh position. Referring to FIG. 18b, roller 128 is prohibited from contacting the root surface 260 as illustrated by the clearance 298 between the roller and the relieved root surface 260 at the point where the roller bridges across the root and seats at points D' and E'.

In particular, FIG. 18b illustrates the point at which the roller 128 is moved radially inward from Point C and contacts the lower flanks at Points D' and E' during rotation of the sprocket 212 around the sprocket wrap 132 (FIG. 7). As shown, the roller 128 can contact only the lower engaging and disengaging flanks. It should be appreciated that as the roller continues to travel around the sprocket wrap, the roller moves outward from Point E' along the disengaging flank 288.

Figure 19:
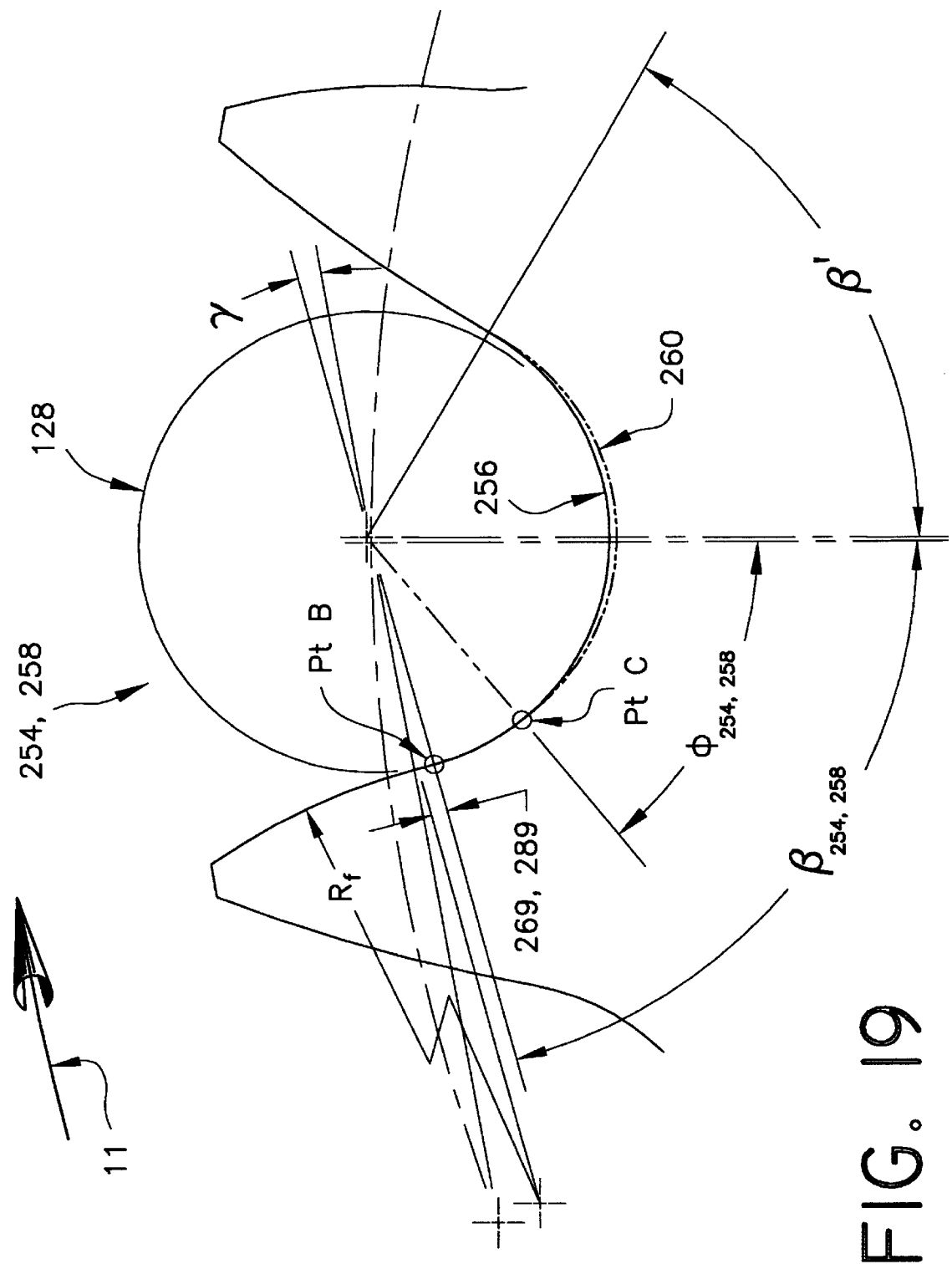
FIG. 19 illustrates the asymmetrical tooth space profile of FIG. 17 overlaid with the asymmetrical tooth space profile of FIG. 18.

FIG. 19 illustrates the asymmetrical tooth space 254 overlaid on the root-relieved asymmetrical tooth space 258. It should be appreciated that the asymmetrical tooth space 254 is substantially identical to the asymmetrical tooth space 258 from the point radially outward of the radially outer end of the flat surface 290, and from the point radially outward of the radially outer end of the flat surface 292 (i.e., the radius $R_f'$ of the disengaging flank 268 is substantially equal to the radius $R_f'$ of the disengaging flank 288).

Figure 20:
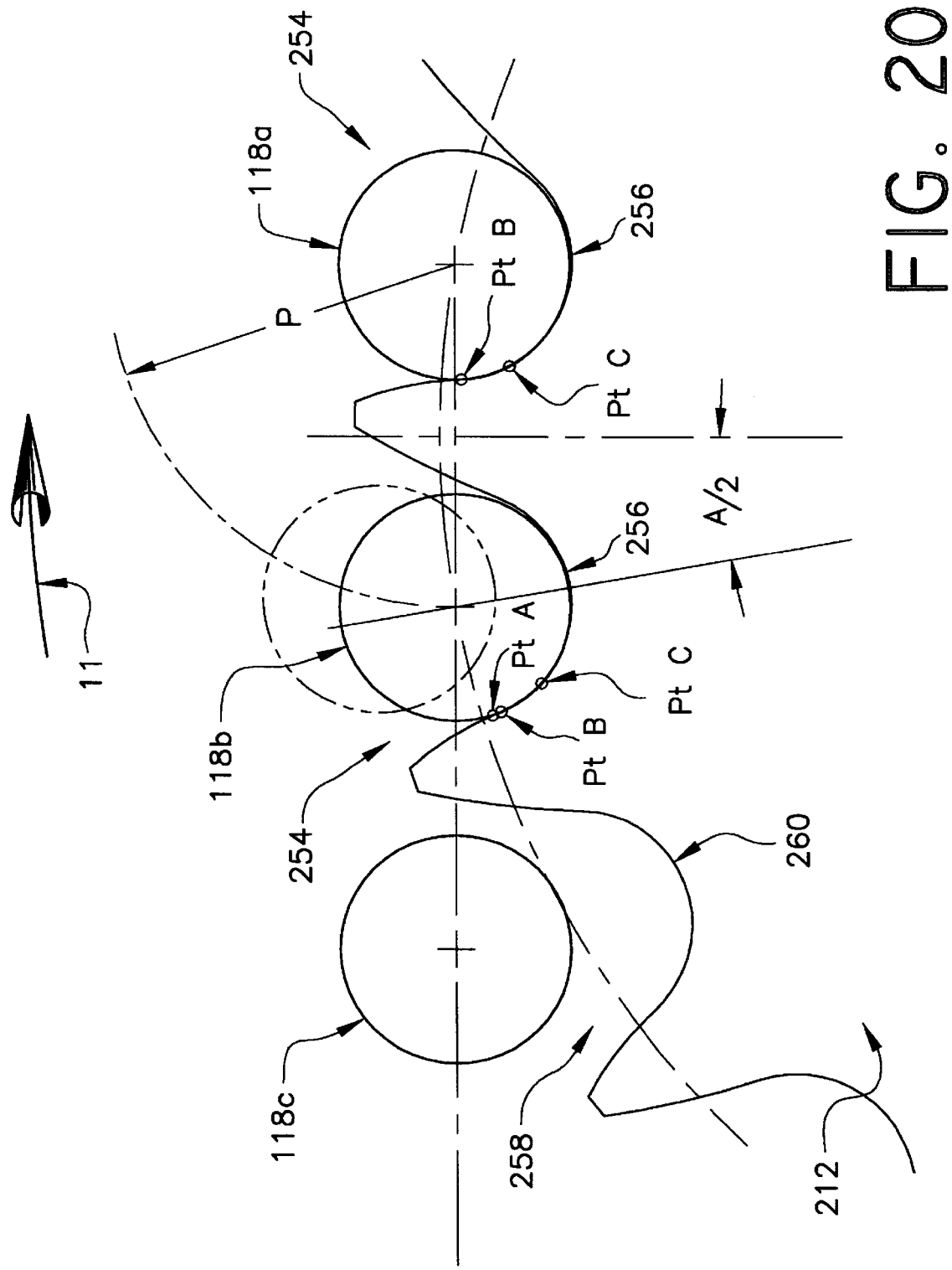
FIG. 20 illustrates the sprocket of FIG. 16 with a first roller fully seated in two-point contact with the sprocket, a second roller at the onset of initial contact with the sprocket, and a third roller about to mesh with the drive sprocket.
Figure 20A:
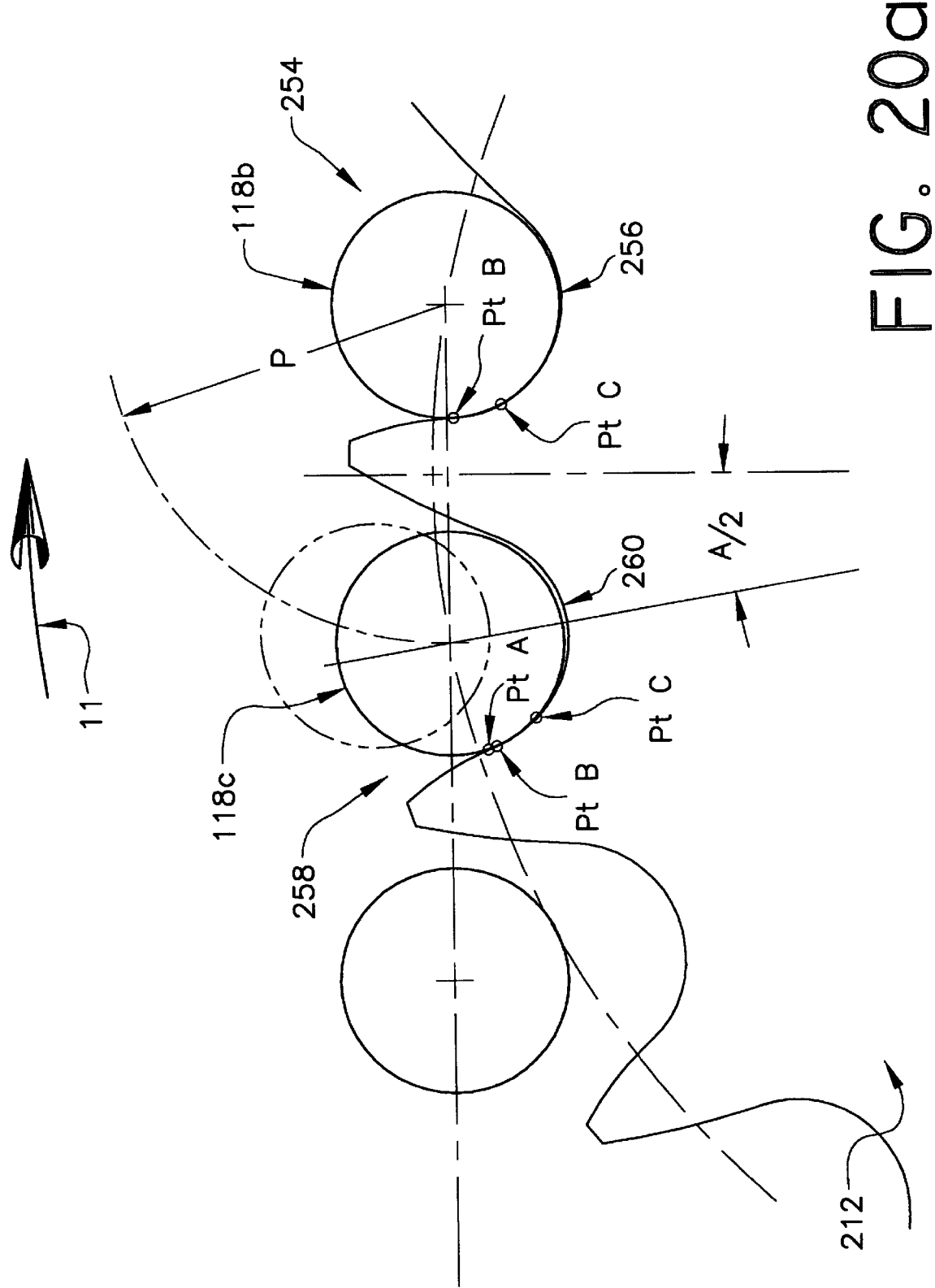
FIG. 20a illustrates the sprocket of FIG. 20 rotated in a clockwise direction until the instant that the third roller initially contacts the sprocket.

FIGS. 20 and 20a illustrate that roller meshing for both tooth profiles 254, 258 occurs at substantially the same frequency for a constant engine speed. In particular, as shown in FIG. 20, the sprocket 212 has a first roller 118a fully-seated in two-point contact at Points B and C within an asymmetrical tooth space 254. The roller 118b is shown at the instant of initial tangential contact at point A of a second sprocket tooth also associated with a tooth profile 254. The roller 118c is the next roller in the span and will mesh with a sprocket tooth associated with a tooth profile 258. The sprocket 212 must rotate through an angle A/2 in order for roller 118b to fully seat in two-point contact at Points B and C at the 12 o'clock position.

With reference to FIG. 20a, the sprocket 212 of FIG. 20 is shown rotated in a clockwise direction until roller 118c is at the onset of meshing with the tooth profile 258. The sprocket 212 must rotate through the same angle A/2 to have roller 118c seated at the 12 o'clock position. Thus, roller meshing for both tooth profiles 254, 258 occurs at substantially the same frequency for a constant engine speed.

As indicated above, the roller seating angles $\beta_{254}$ and $\beta_{258}$ for the respective asymmetrical tooth spaces 254 and 258 are the substantially equal. Likewise, the angles $\phi_{254}$ and $\phi_{258}$ are substantially equal. As a result, the initial tangential roller-sprocket impacts occur at substantially the same contact Point A for both profiles 254, 258. Likewise, the subsequent radial roller-sprocket impacts occur at substantially the same contact Point C and full mesh seating occurs at Points B and C for both profiles 254, 258. However, it should be appreciated that one or both of the roller seating angles $\beta_{254}$, $\beta_{258}$ and the angles $\phi_{254}$, $\phi_{258}$ could vary in order to stagger one or more of the initial contact points and the subsequent radial impact points.

Figure 21:
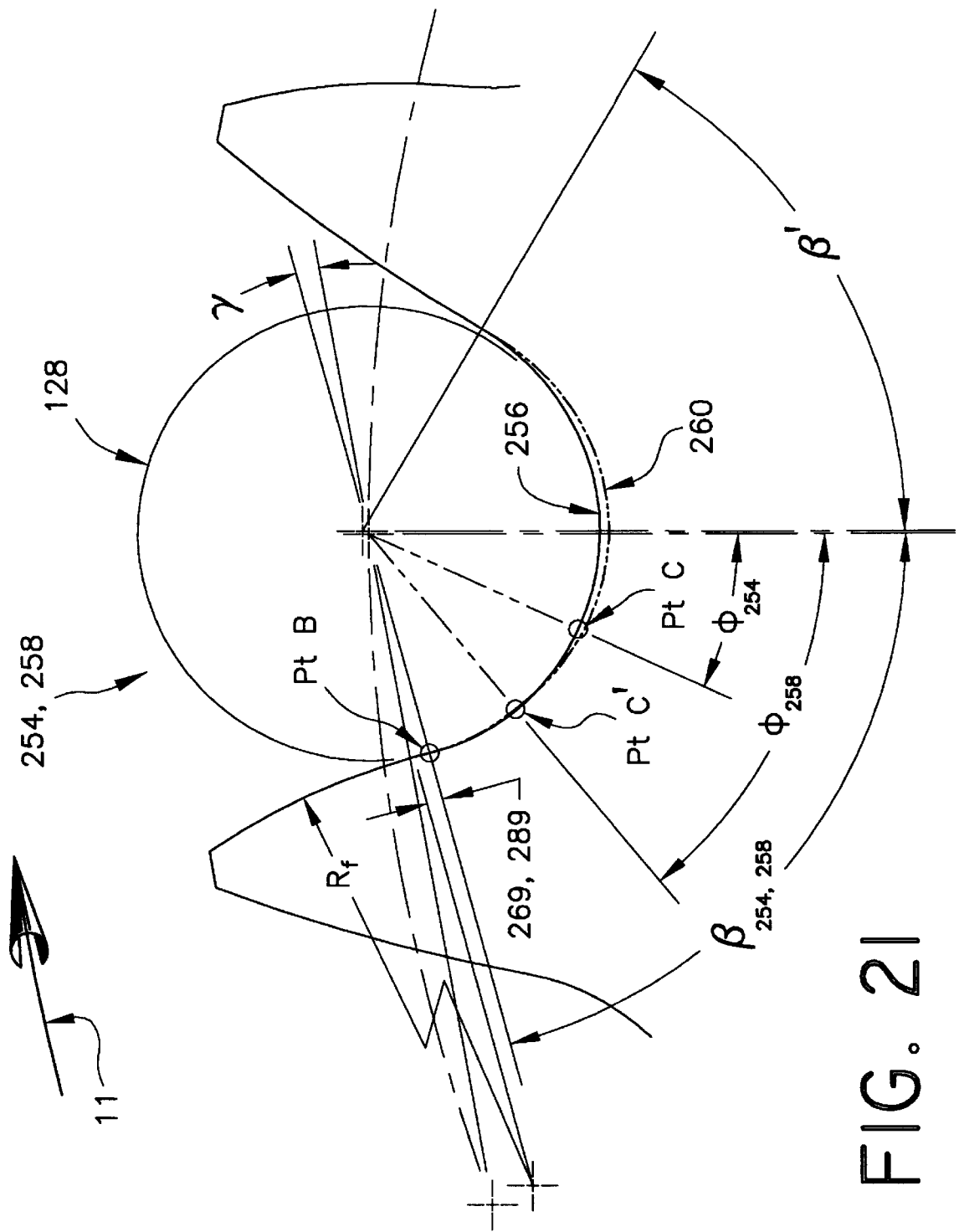
FIG. 21 illustrates a third embodiment of a random-engagement roller chain drive sprocket with a first asymmetrical tooth space profile overlaid with a second asymmetrical tooth space profile.

For instance, with reference to FIG. 21, the roller seating angle $\beta_{254}$ is substantially equal to the roller seating angel $\beta_{258}$, and the angle $\phi_{254}$ is less than the angle $\phi_{258}$. As a result, the initial tangential roller-sprocket impacts occur at substantially the same contact Point A for both profiles 254, 258. However, a subsequent radial roller-sprocket impact occurs at contact Point C and full mesh seating occurs at Points B and C for the profile 254, and a subsequent radial roller-sprocket impact occurs at contact Point C' and full mesh seating occurs at Points B and C' for the profile 258, thus staggering the relative subsequent radial impacts for the profiles 254, 258.

Figure 22:
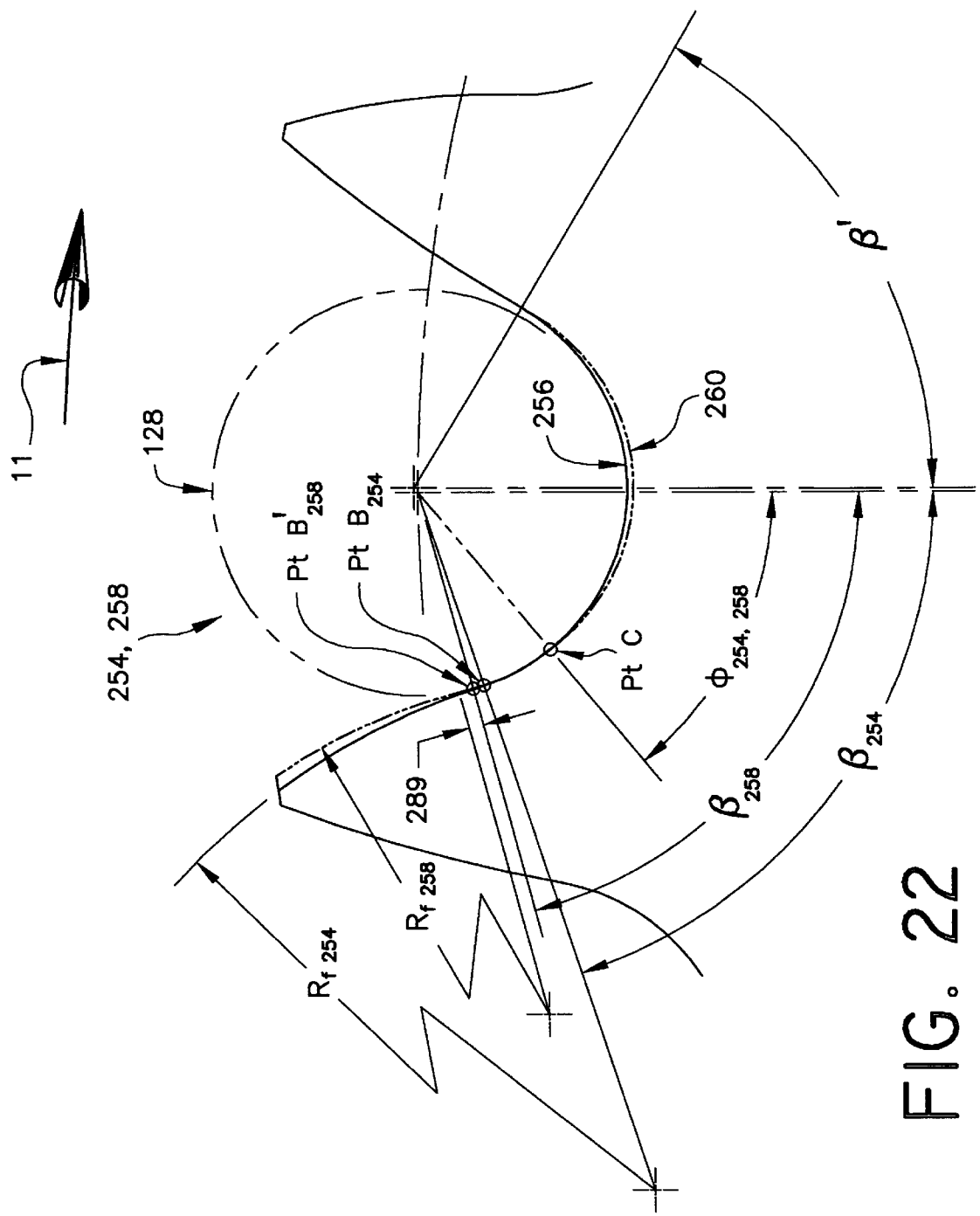
FIG. 22 illustrates a fourth embodiment of a random-engagement roller chain drive sprocket with a first asymmetrical tooth space profile overlaid with a second asymmetrical tooth space profile.

With reference to FIG. 22, the roller seating angle $\beta_{254}$ is greater than the roller seating angle $\beta_{258}$, and the angle $\phi_{254}$ is substantially equal to the angle $\phi_{258}$. As a result, an initial tangential roller-sprocket impact occurs at contact Point A (not shown) for the profile 254, and an initial tangential roller-sprocket impact occurs at contact Point A' (not shown) for the profile 258. Further, a subsequent radial roller-sprocket impact occurs at contact Point C and full mesh seating occurs at Points B and C for the profile 254, and a subsequent radial roller-sprocket impact occurs at contact Point C and full mesh seating occurs at Points B' and C' for the profile 258, thus staggering the relative initial tangential impacts for the profiles 254, 258.

Figure 23A:
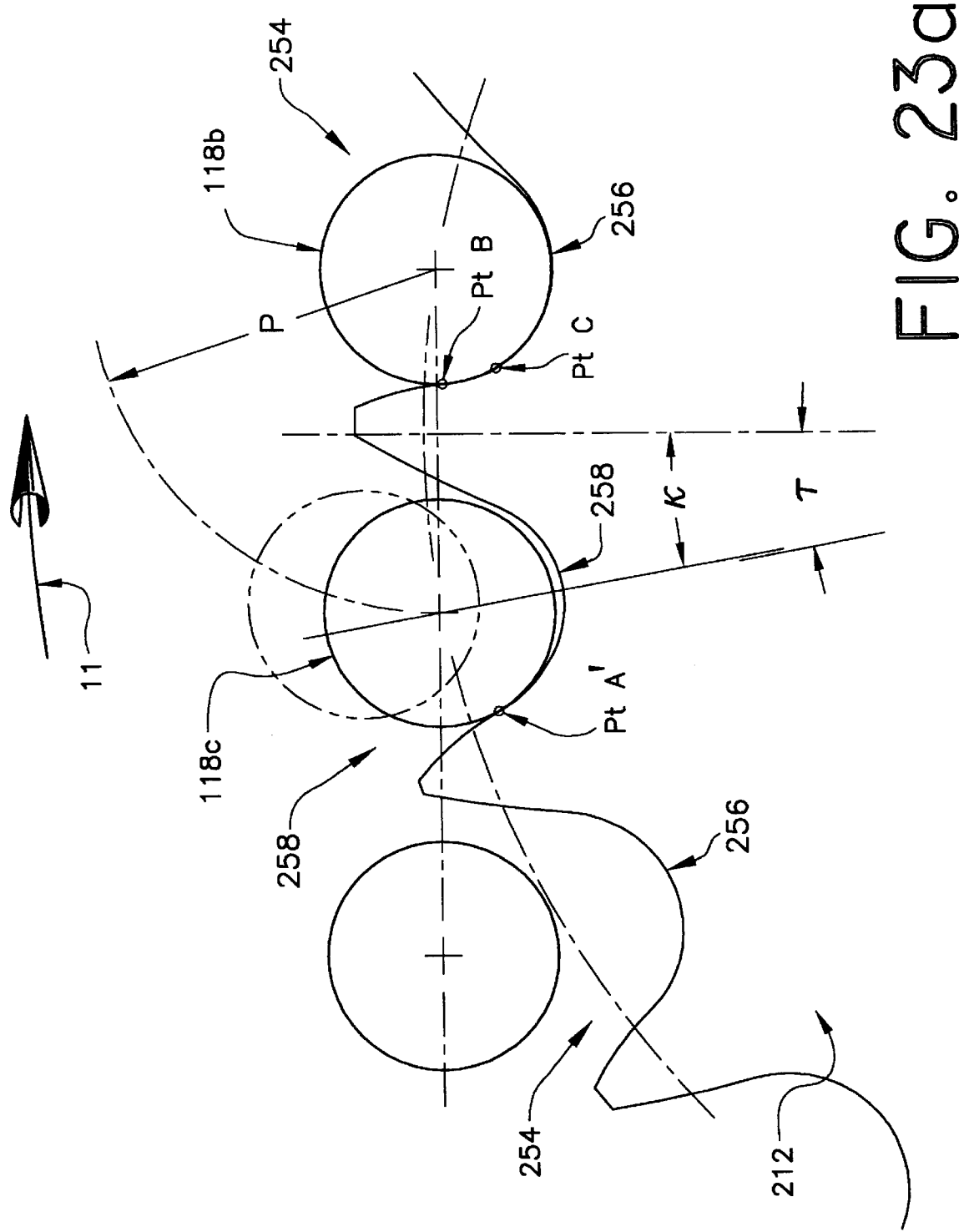
FIG. 23a illustrates the sprocket of FIG. 23 rotated in a clockwise direction until the instant that the third roller initially contacts the sprocket.

FIGS. 23 and 23a illustrate the meshing delay between the tooth profiles 254, 258. In particular, FIG. 23 illustrates the sprocket 212 of FIG. 22 with a first roller 118a fully-seated in two-point contact at Points B and C of a sprocket tooth associated with the tooth profile 254. The roller 118b is shown at the instant of initial tangential contact at point A of a second sprocket tooth also associated with the tooth profile 254. The roller 118c is the next roller in the span and will mesh with a sprocket tooth associated with the tooth profile 258. FIG. 23a illustrates the sprocket of FIG. 23 rotated in a clockwise direction until the instant of meshing contact of the third roller 118c in its root relieved tooth space 258 at Point A'.

The initial contact for roller 118b occurs at the angle $\tau$. The initial contact for the roller 118c occurs at the angle $\kappa$. The initial contact for the roller 118c, therefore, is delayed in that the sprocket must rotate an additional angle $\tau$-$\kappa$. Thus, the meshing frequency is modulated.

Figure 24:
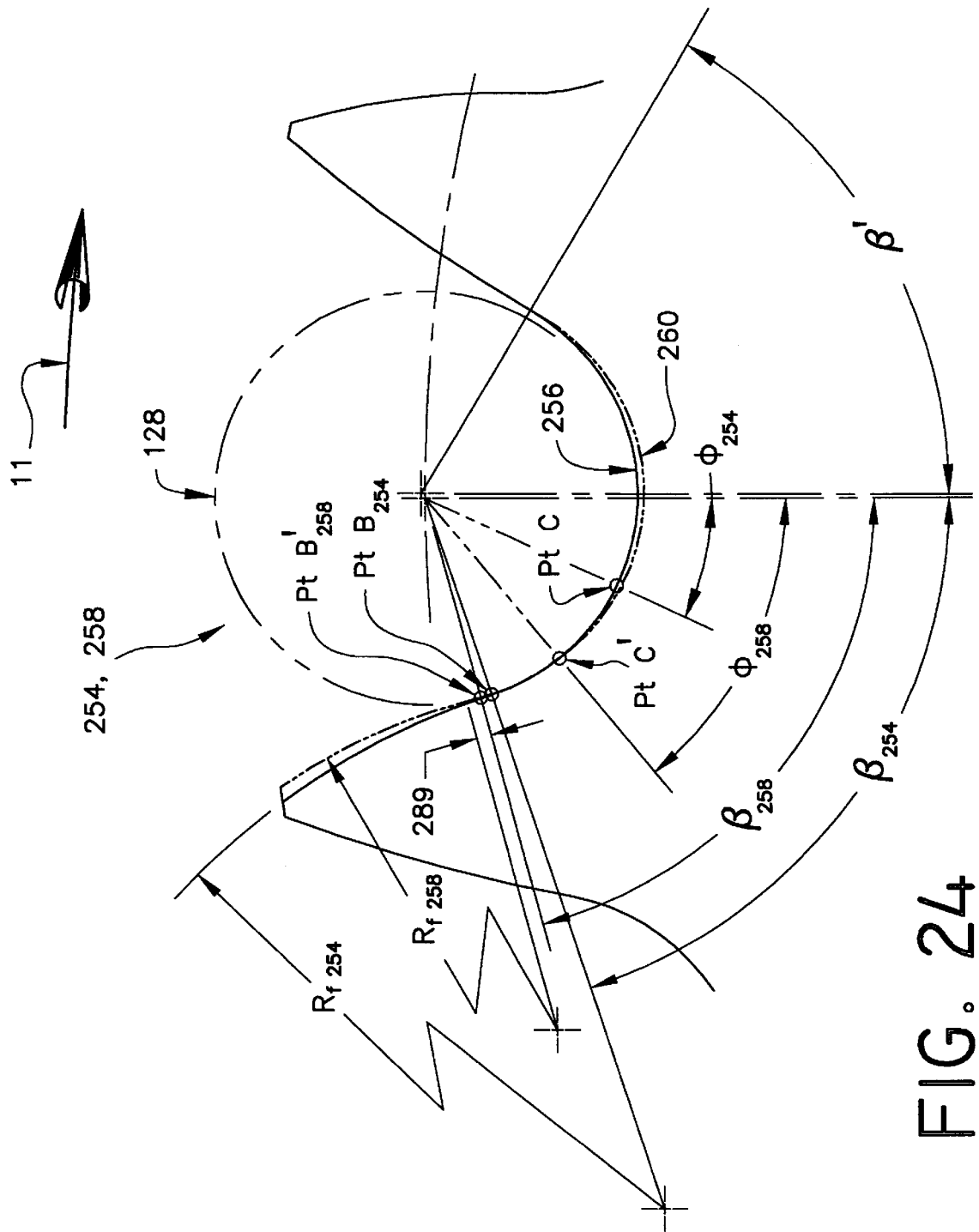
FIG. 24 illustrates a fifth embodiment of a random-engagement roller chain drive sprocket with a first asymmetrical tooth space profile overlaid with a second asymmetrical tooth space profile.

With reference to FIG. 24, the roller seating angle $\beta_{254}$ is less than the roller seating angle $\beta_{258}$, and the angle $\phi_{254}$ is less than the angle $\phi_{258}$. As a result, an initial tangential roller-sprocket impact occurs at contact Point A (not shown) for the profile 254, and an initial tangential roller-sprocket impact occurs at contact Point A' (not shown) for the profile 258. Further, a subsequent radial roller-sprocket impact occurs at contact Point C and full mesh seating occurs at Points B and C for the profile 254, and a subsequent radial roller-sprocket impact occurs at contact Point C' and full mesh seating occurs at Points B' and C' for the profile 258, thus staggering the relative initial tangential impacts and the subsequent radial impacts for the profiles 254, 258.

The above-described random engagement roller chain sprockets 112 and 212 each incorporate two different sets of tooth profiles that are arranged in a random or arbitrary pattern in order to modify the meshing impact frequency by altering the point and rhythm of the initial roller-to-sprocket contacts from one tooth profile to the next. It should be appreciated that the different sets of tooth profiles can be arranged in many different random or arbitrary patterns. Further, it is also contemplated that the different sets of tooth profiles can be arranged in many regular patterns that would work equally as well. In all cases, the arrangement of two sets of different tooth profiles on a sprocket provides a means for breaking up the mesh frequency impact noise normally associated with and induced by a full complement of substantially identically shaped sprocket teeth. The mesh frequency noise reduction is achieved by altering the point and rhythm of initial roller-to-sprocket contacts from one tooth profile to the next.

The crankshaft sprocket, generally the smallest sprocket in the chain drive, is usually the major noise contributor. The typically larger driven camshaft sprocket, however, will also contribute to the generated noise levels, but generally to a lesser extent than the crankshaft sprocket. However, the driven sprocket, particularly if it is nearly the same size or smaller than the driving sprocket, may be the prime noise generator, as in the case with balance shaft sprockets and pump sprockets. Thus, the features of the present invention may also be used advantageously with camshaft or driven sprockets as well.

It should be appreciated that the disclosed asymmetrical tooth profile features can be altered slightly without substantially deviating from the chain and sprocket meshing kinematics that produce the noise reduction advantages of the present invention. For example, the engaging asymmetrical flank profiles can be approximated by an involute form, and the disengaging asymmetrical flank profiles can be approximated by a different involute form. Slight changes to the profile may be done for manufacturing and/or quality control reasons—or simply to improve part dimensioning.

The invention has been described with reference to the preferred embodiments. Obviously, modifications will occur to others upon a reading and understanding of this specification and this invention is intended to include same insofar as they come within the scope of the appended claims or the equivalents thereof.

For instance, it should be appreciated that the tooth space embodiments of the present invention can be classified as being asymmetrical when i) the engaging side roller seating angle $\beta$ is greater than the disengaging side roller seating angle $\beta'$, and ii) the engaging side roller seating angle $\beta$ is equal to disengaging side roller seating angle $\beta'$ and the engaging side profile is different than the adjacent disengaging side profile, such as when the engaging side includes a flank flat 269, 289, etc.

Further, as with the asymmetrical tooth profiles 254, 258 of the random engagement roller sprocket 212, the asymmetrical tooth profiles 154, 158 can have different engaging side roller seating angles $\beta$ and $\phi$ angles in the manner illustrated in FIGS. 21, 22, and 24.

It is believed that random engagement sprockets incorporating a number of root relieved tooth space profiles provides NVH gains by causing the roller-sprocket impacts to occur at the lower flanks rather than at the roots, thus reducing the severity of the roller-sprocket impacts.

Having thus described the preferred embodiments, the invention is now claimed to be:

1. A sprocket comprising:

a first plurality of teeth each having a first engaging flank and a first disengaging flank;

a second plurality of teeth each having a second engaging flank and a second disengaging flank;

one of said first engaging flanks cooperating with one of said first disengaging flanks or said second disengaging flanks of a first adjacent tooth to define a first asymmetrical tooth space for receiving a roller of an associated roller chain, said first asymmetrical tooth space including a first root surface between said one of the first engaging flanks and the first disengaging flanks or the second disengaging flanks, and said first root surface being adapted for contacting a roller of an associated roller chain during rotation of the sprocket; and one of said second engaging flanks cooperating with one of said first disengaging flanks or said second disengaging flanks of a second adjacent tooth to define a second asymmetrical tooth space for receiving a roller of an associated roller chain, said second asymmetrical tooth space including a second root surface between said one of the second engaging flanks and the first disengaging flanks or the second disengaging flanks, and said second root surface being spaced from a roller of an associated roller chain so as to define a clearance therebetween during rotation of the sprocket.

2. The sprocket of claim 1, wherein at least one of the first and second asymmetrical tooth spaces is defined by an engaging side roller seating angle ($\beta$) that is greater than a disengaging side roller seating angle ($\beta'$).

3. The sprocket of claim 2, wherein at least one of the first and second root surfaces includes an engaging side root surface portion having a radius that is less than a radius of a roller of an associated roller chain.

4. The sprocket of claim 3, wherein at least one of the first and second engaging flanks includes a flat surface positioned between the respective engaging flank and root surface.

5. The sprocket of claim 4, wherein said at least one flat surface includes a first portion and a second portion, said first portion promoting an initial tangential roller-sprocket impact, and said second portion promoting two-point roller seating within the respective asymmetrical tooth space.

6. The sprocket of claim 2, wherein:

the first asymmetrical tooth space is defined by a first engaging side roller seating angle ($\beta$); and the second asymmetrical tooth space is defined by a second engaging side roller seating angle ($\beta$) that is different from the first roller seating angle.

7. The sprocket of claim 1, wherein at least one of the first and second root surfaces includes an engaging side root surface portion having a radius that is less than a radius of a roller of an associated roller chain.

8. The sprocket of claim 1, wherein at least one of the first and second engaging flanks includes a flat surface positioned between the respective engaging flank and root surface.

9. The sprocket of claim 1, wherein at least one of the first and second root surfaces includes at least one inclined root surface portion for providing tooth space clearance (TSC).

10. The sprocket of claim 1, wherein the second root surface includes a first flat portion on an engaging side of said second root surface and a second flat portion on a disengaging side of said second root surface, said first and second flat portions cooperating to provide the clearance between said second root surface and a roller within said second asymmetrical tooth space.

11. A unidirectional roller chain drive system including a first sprocket, a second sprocket, and a roller chain having rollers in engaging contact with the first and second sprockets, wherein at least one of the first and second sprockets comprises:

a first plurality of teeth each having a first engaging flank and a first disengaging flank;

a second plurality of teeth each having a second engaging flank and a second disengaging flank;

one of said first engaging flanks cooperating with one of said first disengaging flanks or said second disengaging flanks of a first adjacent tooth to define a first asymmetrical tooth space for receiving a roller associated with the roller chain, said first asymmetrical tooth space including a first root surface between said one of the first engaging flanks and the first disengaging flanks or the second disengaging flanks, and said first root surface being adapted for contacting a roller associated with roller chain during rotation of the sprocket; and one of said second engaging flanks cooperating with one of said first disengaging flanks or said second disengaging flanks of a second adjacent tooth to define a second asymmetrical tooth space for receiving a roller associated with the roller chain, said second asymmetrical tooth space including a second root surface between said one of the second engaging flanks and the first disengaging flanks or the second disengaging flanks, and said second root surface being spaced from a roller of the associated roller chain so as to define a clearance therebetween during rotation of the sprocket.

12. The chain drive system of claim 11, wherein at least one of the first and second asymmetrical tooth spaces is defined by an engaging side roller seating angle ($\beta$) that is greater than a disengaging side roller seating angle ($\beta'$).

13. The chain drive system of claim 12, wherein at least one of the first and second root surfaces includes an engaging side root surface portion having a radius that is less than a radius of a roller associated with the roller chain.

14. The chain drive system of claim 1, wherein at least one of the first and second engaging flanks includes a flat surface positioned between the respective engaging flank and root surface.

15. The chain drive system of claim 14, wherein said at least one flat surface includes a first portion and a second portion, said first portion promoting an initial tangential roller-sprocket impact, and said second portion promoting two-point roller seating within the respective asymmetrical tooth space.

16. The chain drive system of claim 12, wherein:

the first asymmetrical tooth space is defined by a first engaging side roller seating angle ($\beta$); and the second asymmetrical tooth space is defined by a second engaging side roller seating angle ($\beta$) that is different from the first roller seating angle.

17. The chain drive system of claim 11, wherein at least one of the first and second root surfaces includes an engaging side root surface portion having a radius that is less than a radius of a roller associated with the roller chain.

18. The chain drive system of claim 1, wherein at least one of the first and second engaging flanks includes a flat surface positioned between the respective engaging flank and root surface.

19. The chain drive system of claim 11, wherein at least one of the first and second root surfaces; includes at least one inclined root surface portion for providing tooth space clearance (TSC).

20. The chain drive system of claim 11, wherein the second root surface includes a first flat portion on an engaging side of said second root surface and a second flat portion on a disengaging side of said second root surface, said first and second flat portions cooperating to provide the clearance between said second root surface and a roller within said second asymmetrical tooth space.

21. A method of modifying a meshing impact frequency of a roller chain meshing with a sprocket, the sprocket including a first plurality of teeth each having a first engaging flank and a first disengaging flank, and a second plurality of teeth each having a second engaging flank and a second disengaging flank, wherein one of the first engaging flanks cooperates with one of the first disengaging flanks or the second disengaging flanks of a first adjacent tooth to define a first asymmetrical tooth space adapted for receiving a first roller of the roller chain, the first asymmetrical tooth space including a first root surface between the one of the first engaging flanks and the first disengaging flanks or the second disengaging flanks, and wherein one of the second engaging flanks cooperates with one of the first disengaging flanks or the second disengaging flanks of a second adjacent tooth to define a second asymmetrical tooth space adapted for receiving a second roller of the roller chain, the second asymmetrical tooth space including a second root surface between the one of the second engaging flanks and the first disengaging flanks or the second disengaging flanks, the method comprising:

(a) during rotation of the sprocket, the first roller meshing with the first asymmetrical tooth space whereby the first roller contacts the first root surface; and (b) during rotation of the sprocket, the second roller meshing with the second asymmetrical tooth space whereby a clearance is maintained between the second roller and the second root surface such that the second roller does not contact at least a portion of the second root: surface.

22. The method of claim 21, wherein:

the first asymmetrical tooth space includes a first engaging side root surface portion having a radius that is less than a radius of the first roller, and step (a) includes the step of rotating the sprocket to cause the first roller to seat at two-points along the first engaging side root surface portion; and the second asymmetrical tooth space includes a second engaging side root surface portion having a radius that is less than a radius of the second roller, and step (b) includes the step of rotating the sprocket to cause the second roller to seat at two-points along the second engaging side root surface portion.

23. The method of claim 21, wherein:

the first asymmetrical tooth space includes a first flat surface between the first engaging flank and the first root surface, and step (a) includes the step of rotating the sprocket to cause the first roller to contact the first flank surface at an onset of the first roller meshing with the first asymmetrical tooth space; and the second asymmetrical tooth space includes a first flat surface between the first engaging flank and the first root surface, and step (a) includes the step of rotating the sprocket to cause the second roller to contact the second flank surface at an onset of the second roller meshing with the second asymmetrical tooth space.

24. The method of claim 21, wherein at least one of the first and second asymmetrical tooth spaces is defined by an engaging side roller seating angle ($\beta$) that is greater than a disengaging side roller seating angle ($\beta'$).

* * * * *